(12) United States Patent
Konrad et al.

(10) Patent No.: US 11,625,095 B2
(45) Date of Patent: Apr. 11, 2023

(54) GAZE SENSORS AND DISPLAY ELEMENTS FOR DETECTION OF GAZE VECTORS AND USER CONTROL AT HEADSET

(71) Applicant: Zinn Labs, Inc., Palo Alto, CA (US)

(72) Inventors: Robert Konrad, San Francisco, CA (US); Kevin Boyle, San Francisco, CA (US); Nitish Padmanaban, Menlo Park, CA (US); Gordon Wetzstein, Palo Alto, CA (US)

(73) Assignee: Zinn Labs, Inc., Palo Alto, CA (US)

( * ) Notice: Subject to any disclaimer, the term of this patent is extended or adjusted under 35 U.S.C. 154(b) by 0 days.

(21) Appl. No.: 17/580,568

(22) Filed: Jan. 20, 2022

(65) Prior Publication Data

US 2022/0236796 A1 Jul. 28, 2022

Related U.S. Application Data

(60) Provisional application No. 63/173,742, filed on Apr. 12, 2021, provisional application No. 63/154,328, (Continued)

(51) Int. Cl.
*G06F 3/01* (2006.01)
*G06F 3/16* (2006.01)
(Continued)

(52) U.S. Cl.
CPC ......... *G06F 3/013* (2013.01); *G02B 27/0172* (2013.01); *G02B 27/0179* (2013.01);
(Continued)

(58) Field of Classification Search
CPC ........ G06F 3/013; G06F 3/165; G06F 3/0304; G02B 27/01; G02B 27/017;
(Continued)

(56) References Cited

U.S. PATENT DOCUMENTS 10,395,111 B2 * 8/2019 Konttori ................. G06V 40/19
11,269,406 B1 * 3/2022 Sztuk ...................... G06F 3/011
(Continued)

FOREIGN PATENT DOCUMENTS

RU 2724442 C1 6/2020
WO WO 2020/224041 A1 11/2020

OTHER PUBLICATIONS

Aksit, K. et al. "Gaze-Sensing LEDs for Head Mounted Displays." arXiv Preprint arXiv:2003.08499v1, Mar. 20, 2020, pp. 1-14.
(Continued)

*Primary Examiner* — Tom V Sheng
(74) *Attorney, Agent, or Firm* — Fenwick & West LLP

(57) ABSTRACT

Embodiments are related to a plurality of gaze sensors embedded into a frame of a headset for detection of a gaze vector of a user wearing the headset and user's control at the headset. The gaze vector for an eye of the user can be within a threshold distance from one of the gaze sensors. By monitoring signals detected by the gaze sensors, it can be determined that the gaze vector is within the threshold distance from the gaze sensor. Based on this determination, at least one action associated with the headset is initiated.

20 Claims, 13 Drawing Sheets

Related U.S. Application Data filed on Feb. 26, 2021, provisional application No. 63/140,701, filed on Jan. 22, 2021.

(51) Int. Cl.
- *G02B 27/01* (2006.01)
- *G09G 3/00* (2006.01)
- *G06F 3/03* (2006.01)
- *G02B 27/00* (2006.01)

(52) U.S. Cl.
CPC ............. *G06F 3/165* (2013.01); *G09G 3/002* (2013.01); *G02B 27/0093* (2013.01); *G02B 27/01* (2013.01); *G02B 27/017* (2013.01); *G02B 2027/0138* (2013.01); *G02B 2027/0178* (2013.01); *G02B 2027/0187* (2013.01); *G06F 3/0304* (2013.01)

(58) Field of Classification Search
CPC ............ G02B 27/0172; G02B 27/0179; G02B 27/0093; G02B 2027/0138; G02B 2027/0178; G02B 2027/0187; G09G 3/002
USPC .......................................................... 345/156
See application file for complete search history.

(56) References Cited

U.S. PATENT DOCUMENTS

| | | | |
|---|---|---|---|
| 2001/0043163 A1* | 11/2001 | Waldern ................. | G06F 3/013 345/7 |
| 2011/0288379 A1 | 11/2011 | Wu | |
| 2012/0019529 A1 | 1/2012 | Kimpe | |
| 2016/0077585 A1* | 3/2016 | Mizuhara ................. | A61B 5/00 345/157 |
| 2016/0195924 A1* | 7/2016 | Weber ..................... | G06F 3/013 345/156 |
| 2016/0292850 A1 | 10/2016 | Perez et al. | |
| 2017/0235931 A1 | 8/2017 | Publicover et al. | |
| 2018/0039386 A1* | 2/2018 | Nishiyama .............. | G06F 3/013 |
| 2018/0054568 A1* | 2/2018 | Sugawara ................ | G09G 5/00 |
| 2019/0327567 A1 | 10/2019 | Blum et al. | |
| 2019/0354173 A1* | 11/2019 | Young .................... | G06N 3/0445 |
| 2019/0354174 A1* | 11/2019 | Young .................... | G09G 5/393 |
| 2019/0370926 A1* | 12/2019 | Hagland ............. | H04N 21/226 |
| 2020/0174255 A1* | 6/2020 | Hollands ............ | G02B 27/0172 |
| 2021/0247610 A1* | 8/2021 | Bhakta .................... | G02B 5/20 |
| 2021/0341998 A1* | 11/2021 | Sun ....................... | G06V 10/44 |
| 2022/0004009 A1* | 1/2022 | Myhre ............... | G02B 27/0172 |
| 2022/0005798 A1* | 1/2022 | Qi ........................... | H01L 33/20 |
| 2022/0011496 A1* | 1/2022 | Bhakta ................. | G02B 3/0087 |
| 2022/0100269 A1* | 3/2022 | Eash ................... | G02B 27/0093 |
| 2022/0238220 A1* | 7/2022 | Konrad .............. | G02B 27/0101 |
| 2022/0261076 A1* | 8/2022 | Choi .................... | H04N 5/2256 |

OTHER PUBLICATIONS

Angelopoulos, A. N. et al. "Event Based, Near Eye Gaze Tracking Beyond 10,000Hz." IEEE Transactions on Visualization and Computer Graphics, Feb. 5, 2021, pp. 1-12.

Borsato, F. H. et al. "A Fast and Accurate Eye Tracker Using Stroboscopic Differential Lighting." Proceedings of the IEEE International Conference on Computer Vision (ICCV) Workshops, Dec. 2015, pp. 110-118.

Katrychuk, D. et al. "Power-Efficient and Shift-Robust Eye-Tracking Sensor for Portable VR Headsets." Proceedings of the 11th ACM Symposium on Eye Tracking Research & Applications, Jun. 25-28, 2019, Denver, CO, USA, pp. 1-8.

Li, T. et al. "Battery-Free Eye Tracker on Glasses." Proceedings of the 24th Annual International Conference on Mobile Computing and Networking, Oct. 29-Nov. 2, 2018, New Delhi, India, pp. 67-82.

Mastrangelo, A. S. et al. "A Low-Profile Digital Eye-Tracking Oculometer for Smart Eyeglasses." 11th International Conference on Human System Interaction (HIS), Jul. 4-6, 2018, pp. 506-512.

Rigas, I. et al. "Photosensor Oculography: Survey and Parametric Analysis of Designs Using Model-Based Simulation." IEEE Transactions on Human-Machine Systems, vol. 48, No. 6, Dec. 2018, pp. 1-12.

Tobiipro. "Dark and Bright Pupil Tracking." TobiiPro.com, 2022, 5 pages, [Online] [Retrieved Apr. 25, 2022], Retrieved from the Internet <URL:https://www.tobiipro.com/learn-and-support/learn/eye-tracking-essentials/what-is-dark-and-bright-pupil-tracking/>.

Padmanaban, N. et al., "Autofocals: Evaluating gaze-contingent eyeglasses for presbyopes," Science Advances, vol. 5, Jun. 28, 2019, pp. 1-7.

Padmanaban, N., "Enabling Gaze-Contingent Accommodation in Presbyopia Correction and Near-Eye Displays," A Dissertation Submitted to the Department of Electrical Engineering and the Committee on Graduate Studies of Stanford University, May 2020, pp. 1-36.

PCT International Search Report and Written Opinion, PCT Application No. PCT/US2022/013193, dated Apr. 21, 2022, 16 pages.

PCT International Search Report and Written Opinion, PCT Application No. PCT/US2022/013195, dated Apr. 26, 2022, 14 pages.

* cited by examiner

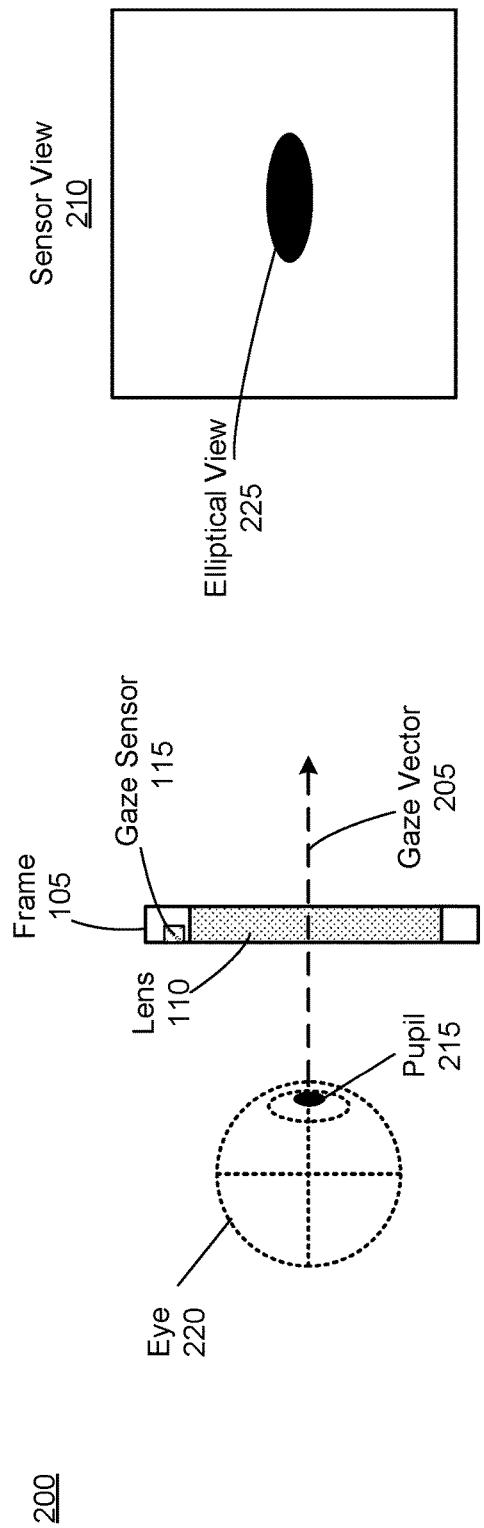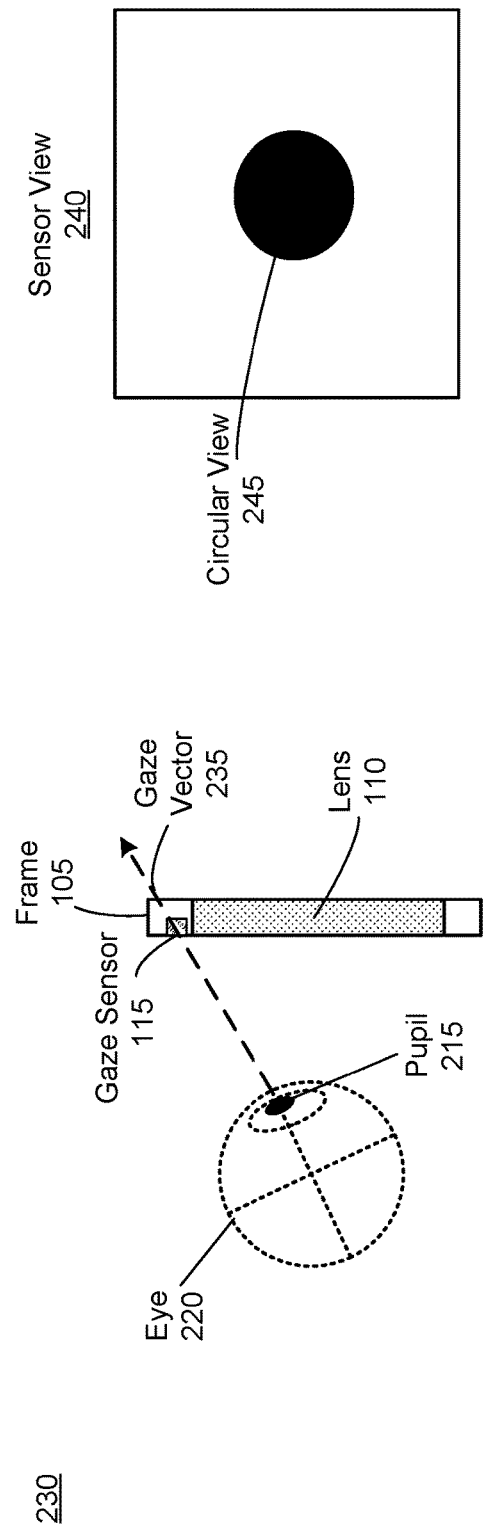

330

340

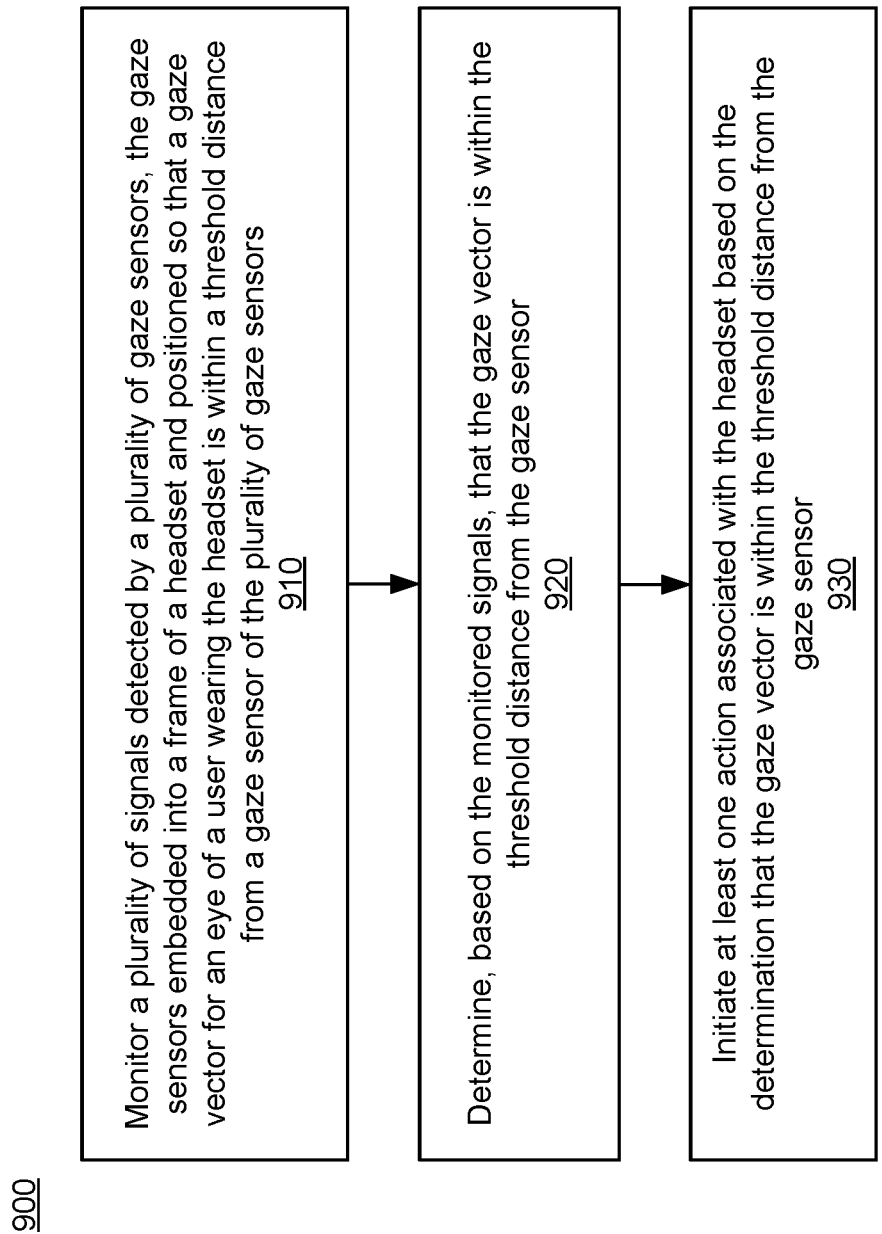

GAZE SENSORS AND DISPLAY ELEMENTS FOR DETECTION OF GAZE VECTORS AND USER CONTROL AT HEADSET

CROSS-REFERENCE TO RELATED APPLICATIONS

This application claims a benefit and priority to U.S. Provisional Patent Application Ser. No. 63/140,701, filed on Jan. 22, 2021, U.S. Provisional Patent Application Ser. No. 63/154,328, filed on Feb. 26, 2021, and U.S. Provisional Patent Application Ser. No. 63/173,742, filed on Apr. 12, 2021, which are hereby incorporated by reference in their entirety.

FIELD OF THE INVENTION

This disclosure relates generally to determination of eye gaze, and more specifically to gaze sensors and display elements for detection of gaze vectors and user control at a headset.

BACKGROUND

For a wearable system, such as a smart electronic eyeglasses, a camera-based sensor for eye tracking must be small, lightweight, and have a low power dissipation. Typical eye-tracking systems that rely on pupil detection calculated from camera images of user's eyes require a high amount of computation for gaze estimation, even if the goal is to categorize a pupil into only a few discrete points for the purpose of user's interface gestures. In addition, even high-power, state-of-the art eye tracking systems have limited robustness across all eye shapes and lighting conditions.

SUMMARY

Embodiments of the present disclosure relate to a plurality of gaze sensors embedded into a frame of a headset for detection of a gaze vector of a user wearing the headset and user's control at the headset. The gaze vector for an eye of the user can be within a threshold distance from one of the gaze sensors. By monitoring signals detected by the gaze sensors, it can be determined that the gaze vector is within the threshold distance from the gaze sensor. Based on this determination, at least one action associated with the headset is initiated.

In some embodiments, the headset comprises a plurality of gaze sensors embedded into a frame of the headset, and a controller coupled to the plurality of gaze sensors. The gaze sensors are positioned so that a gaze vector for an eye of a user wearing the headset is within a threshold distance from a gaze sensor of the plurality of gaze sensors. The controller is configured to: monitor a plurality of signals detected by the gaze sensors; determine, based on the monitored signals, that the gaze vector is within the threshold distance from the gaze sensor; and initiate at least one action associated with the headset based on the determination.

In some other embodiments, the headset comprises a plurality of gaze sensors embedded into a frame of the headset, at least one display element embedded into the frame, and a controller coupled to the plurality of gaze sensors and the at least one display element. The gaze sensors are positioned so that a gaze vector for an eye of a user wearing the headset is within a threshold distance from a gaze sensor of the plurality of gaze sensors. The controller is configured to: monitor a plurality of signals detected by the gaze sensors; determine, based on the monitored signals, that the gaze vector is within the threshold distance from the gaze sensor; initiate at least one action associated with the headset based on the determination; and instruct the at least one display element to emit visible light toward the eye based on the determination.

Some embodiments of the present disclosure relate to a method for initiating at least one action associated with the headset based on determination of a direction of a user's gaze vector. The method comprises: monitoring a plurality of signals detected by a plurality of gaze sensors, the gaze sensors embedded into a frame of a headset and positioned so that a gaze vector for an eye of a user wearing the headset is within a threshold distance from a gaze sensor of the plurality of gaze sensors; determining, based on the monitored signals, that the gaze vector is within the threshold distance from the gaze sensor; and initiating at least one action associated with the headset based on the determination.

In some other embodiments, the headset comprises one or more display elements embedded into the frame, and a controller coupled to the one or more display elements. The one or more display elements are positioned within the frame such that a user wearing the headset can see the one or more display elements in the periphery of their field of view, or such that the user can look to the one or more display elements in order to bring the one or more display elements into the field of view. The controller may provide display instructions to the one or more display elements for configuring the one or more display elements to display information associated with at least one of: a status of the headset, one or more features of the headset, and a status of a device (e.g., a smartphone or console) paired with the headset.

BRIEF DESCRIPTION OF THE DRAWINGS

FIG. 2A illustrates an example direction of a user's gaze vector relative to a location of a gaze sensor integrated into a frame of the headset in FIG. 1A and a corresponding sensor view.

FIG. 2B illustrates another example direction of a user's gaze vector relative to a location of a gaze sensor integrated into frame of the headset in FIG. 1A and a corresponding sensor view.

FIG. 9 is a flow chart illustrating a process for initiating at least one action associated with a headset based on determination of a direction of a user's gaze vector, in accordance with one or more embodiments.

Figure 1A:
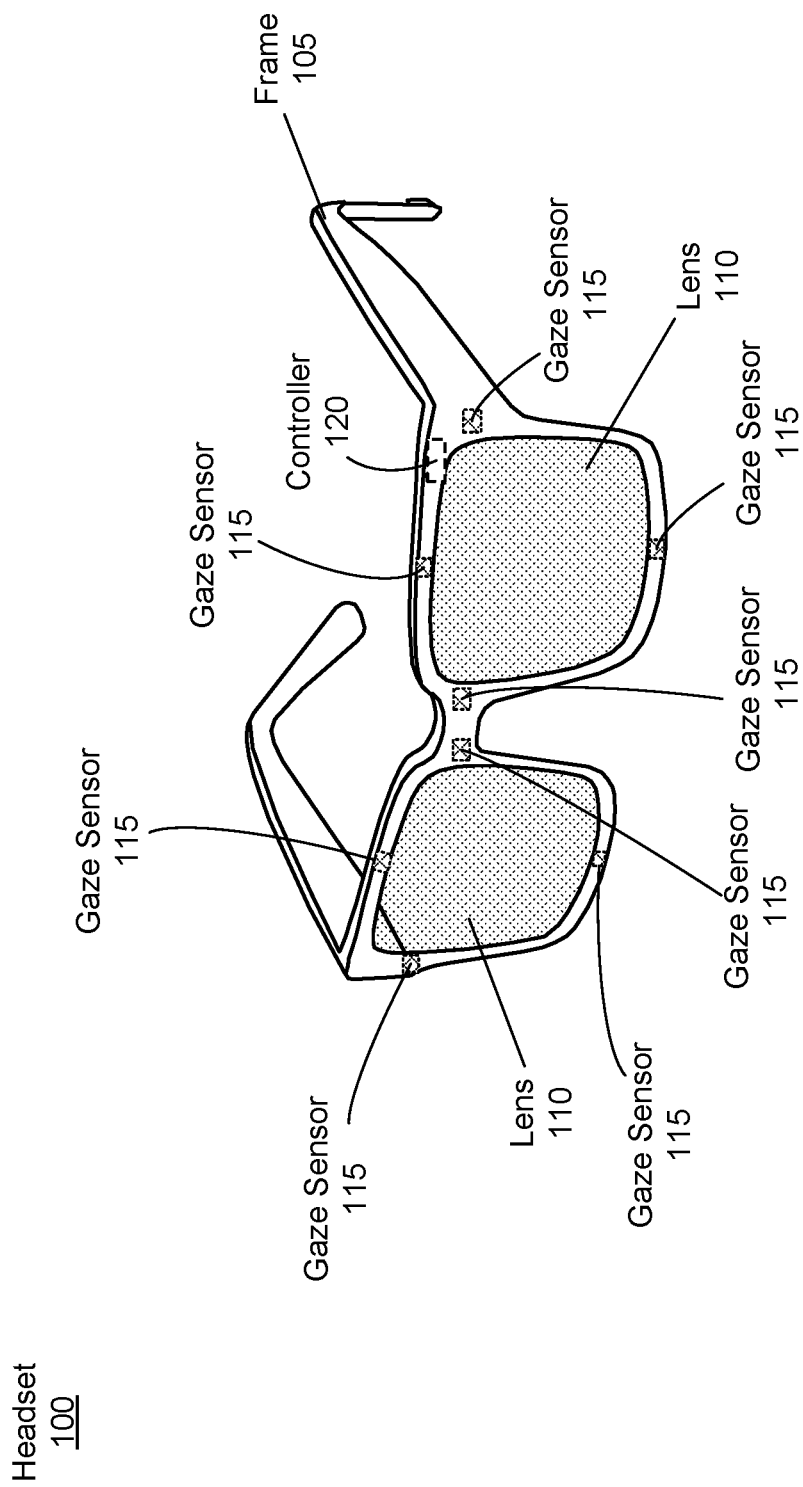
FIG. 1A is a perspective view of a headset including a plurality of gaze sensors for determining a direction of a user's gaze vector, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Embodiments of the present disclosure relate to a plurality of gaze sensors embedded into a frame of a headset, e.g., smart electronic eyeglasses. The gaze sensors are mounted on the frame so that in some embodiments a user wearing the headset may actually gaze into a gaze sensor of the plurality of gaze sensors or in a vicinity of the gaze sensor, i.e., within a threshold distance from the gaze sensor. Each gaze sensor may be implemented as, e.g., an infrared (IR) photodiode paired with an IR light source, a self-mixing interference (SMI) based sensor, some other type of sensor that detects eye gaze, or combination thereof. A controller integrated into the headset and interfaced with the gaze sensors can monitor a plurality of signals detected by the gaze sensors to determine whether a gaze vector of a user's eye (i.e., user's eye gaze) is within a threshold distance from the gaze sensor, i.e., whether the user is looking at or close to the gaze sensor. After the controller determines that the gaze vector is within the threshold distance of the gaze sensor, the controller may initiate certain action(s) associated with the headset. The action(s) being initiated may include: adjustment of an optical power for at least one portion of a lens of the headset, adjustment of audio content (e.g., adjustment of audio volume) provided to the user via an audio system, start providing audio content to the user (e.g., start playing music), stop providing audio content to the user (e.g., stop playing music), some other action, or combination thereof. In some embodiments, the gaze sensor further includes a visible light source (e.g., a light emitting diode (LED)), thus providing a visible feedback to the user, e.g., after being determined that the gaze vector is within the threshold distance of the gaze sensor. Alternatively, the gaze sensor may feature some other feedback signal mechanism, e.g., implemented as a vibration signal, an auditory signal, some other signal provided to the user, or combination thereof.

A headset (e.g., smart electronic eyeglasses) that a user wears can benefit from a hands-free control of functions activated by the gaze sensors. The gaze sensors described herein can also provide a hands-free interface with at least one other headset or at least one other device (e.g., console) coupled to the headset. The present disclosure describes methods and systems for user interaction in which a user gazes into a gaze sensor embedded into a frame of the headset, and the gaze sensor detects that the user's gaze vector is within a threshold distance from the gaze sensor, which may activate certain function of the headset. Multiple gaze sensors may be embedded into the frame of the headset, thus providing various possible interactions for the user, each of which can be linked to different headset's functionality, as if the gaze sensors were, e.g., functional buttons operated by user's inputs.

Gaze sensors presented herein may be discrete sensors embedded into the frame of the headset that the user can gaze into, such that each gaze sensor can robustly detect a direction of gaze vector (i.e., eye gaze) at low power requirements. This may be achieved by implementing each gaze sensor as an infrared (IR) light emitter/detector pair (e.g., LED paired with photodiode, hybrid sensor, etc.) that detects a bright pupil effect of IR light emitted from the IR light emitter and reflected from a pupil of a user's eye directly back to the IR detector (e.g., IR photodiode). To achieve the reliable bright pupil effect, the IR light emitter and the IR detector may be positioned in a coaxial alignment (i.e., the IR light emitter and the IR detector may have a common axis). The IR light emitter emits IR light to an eye of the user, and the IR photodiode detects a signal related to a version of the IR light reflected from at least one surface (e.g., pupil, retina, etc.) of the user's eye. The amount of reflected light is maximized when the gaze vector is positioned at the IR light emitter. The ensemble behavior of multiple emitter/detector pairs integrated into the frame of the headset can accurately isolate a bright pupil signal (i.e., desired signal) from ambient environmental lighting conditions (i.e., undesired signals).

Alternatively, the gaze sensors mounted on the headset may be implemented as an array of detectors (e.g., IR photodiodes) detecting one or more light signals reflected from at least one surface of a user's eye. The array of detectors may be calibrated to detect a specific version of the user's eye gaze. Original eye tracking light being detected at the array of detectors (after reflection from the at least one surface of the user's eye) may be emitted from one or more light emitters mounted on the headset working in sync with the array of detectors.

To reduce interference from one or more other sources mounted on the headset (e.g., one or more other gaze sensors), light emitted from an IR light emitter of a gaze sensor may be modulated and a version of the emitted light captured by the gaze sensor may need to be demodulated before being detected by an IR detector of the gaze sensor. The modulation/demodulation of the light emitter/detector pair may be implemented as a dedicated electronic component (e.g., an application specific integrated circuit (ASIC) component), e.g., integrated into the gaze sensor or implemented as a separate component from the gaze sensor. Alternatively, the modulation/demodulation of the light emitter/detector pair may be implemented in software, e.g., at a microcontroller coupled to the gaze sensor (and potentially coupled to one or more other gaze sensors mounted on the headset).

In some embodiments, the gaze sensors are implemented to detect the IR light emitted in a dark pupil configuration, in which the amount of light returned to each gaze sensor is a calibrated function of the eye's relative orientation. In such manner, it is possible to generically determine if the eye is gazing at a particular gaze sensor without relying specifically on the bright pupil response. Thus, a calibration of the IR light across the whole array of gaze sensors embedded into the frame of the headset to implement the gaze-into behavior such that the reflected light is not necessarily maximized at a gaze sensor when the user's gaze vector is positioned directly into the gaze sensor.

The gaze sensors presented herein may be used for coarse estimation of pupil position, coarse eye tracking with relatively high angular accuracy gaze detection (e.g., less than 1 degree), isolation of a position of a gaze vector to large (discrete) regions of a field of view (e.g., left, right, up, down, center, etc.), estimation of relative eye pattern movements (e.g., reading, eyes closed, repeated vergence changes, etc.), user identification by, e.g., matching characteristic eye movements or matching an output of the gaze sensors to a pre-stored user profile, some other operation, or combination thereof. More details about a structure and operations of the gaze sensors are provided in conjunction with FIG. 1A through FIG. 5B and FIG. 9.

The accurate isolation of desired signal may be also achieved by utilizing SMI based gaze sensors using a combination of an IR LED and vertical-cavity surface-emitting laser (VCSEL). The SMI based gaze sensors can be tuned to respond only to their own self-interference, thus resulting in extremely high isolation from environmental lighting conditions. This allows the SMI based gaze sensors to measure with high precision both a distance to a target (e.g., at least one surface of a user's eye) and a target's axial velocity. After a user's gaze vector is directly positioned into an SMI based gaze sensor (i.e., after the gaze vector is within a predefined threshold distance from the SMI based gaze sensor), the SMI based gaze sensor can robustly measure a distance to, e.g., the user's retina. The SMI based gaze sensor can also measure a distance to the user's sclera. For example, after the gaze vector is not aligned with the SMI based gaze sensor (i.e., after the gaze vector is not within the threshold distance from the SMI based gaze sensor), the SMI based gaze sensor may measure the distance to the sclera. In both cases, the SMI based gaze sensor features low power consumption. More details about the SMI based gaze sensors are provided in conjunction with FIG. 6.

In accordance with some embodiments of the present disclosure, a visual feedback can be provided to the user wearing the headset via one or more display elements embedded into the frame of the headset. The visual feedback may provide information to the user about one or more functions of the headset. Each display element presented herein may indicate at least one function associated with a corresponding co-located gaze sensor. Alternatively or additionally, the display element may communicate other static or dynamic information to the user, e.g., user alerts, battery indicators, time information, some other information, or combination thereof. A display element embedded into the frame may be co-located with a specific gaze sensor, providing, e.g., a landmark for a user's gaze vector as well as a visual feedback to the user about a state of interaction with that specific gaze sensor. The visual feedback may be provided at an edge of a user's field of view, e.g., through a lens of the display element. In one embodiment, the display element is a LED modulated to different intensities or blinking patterns. In another embodiment, the display element (e.g., a bokode or pinlight display) includes a patterned mask element or other holographic optical element designed to project a static image onto a retina of the user's eye even when a light emitter of the display element is not at a focal distance of the user's gaze. In yet another embodiment, the display element is implemented as a micro-LED display with a patterned mask element capable of projecting dynamic images onto the user's retina despite being out of focus. In yet another embodiment, the display element is implemented as a timer. In such case, the display element (i.e., timer) may generate time information provided to the user's eye via image light as an analog clock (e.g., with second, minute, and hour hands) or a digital clock after being magnified by a magnifying optic before reaching the user's eye. Alternatively or additionally, a pair of display elements across both user's eyes may be positioned to fuse images projected onto the user's eyes into a stereo image, e.g., despite the fact that the display elements may be out of focus. More details about a structure and operations of display elements are provided in conjunction with FIGS. 7A-7B and FIG. 8.

In some embodiments, a visual feedback may be provided to the user independently of a gaze sensor. In such cases, at least one display element embedded into the frame of the headset may operate independently of any gaze sensor, i.e., there may be no gaze sensor associated with the at least one display element. Such a stand-alone display element may be implemented as, e.g., a visible LED, a static display element, a dynamic display element, a timer (e.g., an analog clock or digital clock), some other type of light source visual feedback signal mechanism, or combination thereof.

FIG. 1A is a perspective view of a headset 100 including a plurality of gaze sensors for determining a direction of a user's gaze vector, in accordance with one or more embodiments. In general, the headset 100 may be worn on the face of a user such that content (e.g., media content) is presented via one or more lenses 110 of the headset 100. However, the headset 100 may also be used such that media content is presented to a user in a different manner. Examples of media content presented by the headset 100 include one or more images, video, audio, or some combination thereof. The headset 100 may include, among other components, a frame 105, a pair of lenses 110, a plurality of gaze sensors 115, and a controller 120. While FIG. 1 illustrates the components of the headset 100 in example locations on the headset 100, the components may be located elsewhere on the headset 100, on a peripheral device paired with the headset 100, or some combination thereof.

The headset 100 may correct or enhance the vision of a user, protect the eye of a user, or provide images to a user. The headset 100 may produce artificial reality content for the user. The headset 100 may be eyeglasses which correct for defects in a user's eyesight. The headset 100 may be sunglasses which protect a user's eye from the sun. The headset 100 may be safety glasses which protect a user's eye from impact. The headset 100 may be a night vision device or infrared goggles to enhance a user's vision at night. The headset 100 may be a mask or full-face respirator that filters a user's air. The headset 100 may be a welding shield or helmet to protect a user's eyes from intense light and the user's face from sparks. The headset 100 may be diving goggles that separate a user's eyes from surrounding water.

The frame 105 holds other components of the headset 100. The frame 105 includes a front part that holds the one or more lenses 110 and end pieces to attach to a head of the user. The front part of the frame 105 bridges the top of a nose of the user. The end pieces (e.g., temples) are portions of the frame 105 to which the temples of a user are attached. The length of the end piece may be adjustable (e.g., adjustable temple length) to fit different users. The end piece may also include a portion that curls behind the ear of the user (e.g., temple tip, ear piece).

The one or more lenses 110 provide light to a user wearing the headset 100. As illustrated, the headset 100 includes a lens 110 for each eye of the user. In some embodiments, each lens 110 is part of a display block (not shown in FIG. 1A) that generates image light that is provided to an eye box of the headset 100. The eye box is a location in space that an eye of the user occupies while the user wears the headset 100. In this context, the headset 100 generates Virtual Reality (VR) content. In some embodiments, one or both of the lenses 110 are at least partially transparent, such that light from a local area surrounding the headset 100 may be combined with light from one or more display blocks to produce Augmented Reality (AR) and/or Mixed Reality (MR) content.

In some embodiments, the headset 100 does not generate image light, and each lens 110 transmits light from the local area to the eye box. For example, one or both of the lenses 110 may be a lens without correction (non-prescription) or a prescription lens (e.g., single vision, bifocal and trifocal, or progressive) to help correct for defects in a user's eyesight. In some embodiments, each lens 110 may be polarized and/or tinted to protect the user's eyes from the sun. In some embodiments, the lens 110 may include an additional optics block (not shown in FIG. 1A). The optics block may include one or more optical elements (e.g., lens, Fresnel lens, etc.) that direct light to the eye box. The optics block may, e.g., correct for aberrations in some or all of visual content presented to the user, magnify some or all of the visual content, or some combination thereof.

In some embodiments, the lens 110 operates as a varifocal optical element that change its focal distance based on a user's eye gaze. The lens 110 may be implemented as a liquid lens, liquid crystal lens, or some other type of lens that is able to vary its optical power. The lens 110 may be directly coupled to the controller 120, and the controller 120 may provide appropriate varifocal instructions (e.g., pulses with various voltage levels) to at least one portion of the lens 110 in order to change at least one optical power associated with the at least one portion of the lens 110.

The gaze sensors 115 detect when a user is looking at each of them within a threshold distance. The gaze sensors 115 are embedded into the frame 105 and there may be different numbers of gaze sensors 115 in the frame 105 relative to FIG. 1A. Each gaze sensor 115 can detect when the user gazes at or sufficiently close to that gaze sensor 115, i.e., when a gaze vector of the user is within a threshold distance from that gaze sensor 115. The gaze sensor 115 may include a light emitter and a detector (not shown in FIG. 1A). The light emitter of the gaze sensor 115 may emit tracking light (e.g., IR light) to the eye of the user, and the detector of gaze sensor 115 detects a signal related to a version of the tracking light reflected from at least one surface (e.g., pupil, retina, sclera, etc.) of the eye. The tracking light may be continuous, pulsed, structured light, some other type of light, or combination thereof. More details about the structure of the gaze sensor 115 are provided in connection with FIGS. 3A-3B, FIG. 6 and FIGS. 7A-7B.

In one or more embodiments, a gaze sensor 115 may provide a visual feedback in accordance with instructions from the controller 120, e.g., after the controller 120 determines that the gaze vector is within the threshold distance from the gaze sensor 115. In such case, a light source that emits light in the visible band may be co-located to the gaze sensor 115. Alternatively or additionally, at least one gaze sensor 115 includes a visual light source for providing the visual feedback (i.e., light in the visible band) to the user. For example, at least one of the gaze sensors 115 can be configured to operate as a blinking LED emitting visible light toward the user.

The gaze sensors 115 can be utilized as functional buttons for user's hands-free operations. For example, the user's looking up/down can be detected by one or more corresponding gaze sensors 115 and mapped to play/pause music; the user's looking left/right can be detected by one or more other corresponding gaze sensors 115 and mapped to playing next/previous track; the user's looking up-left/down-right can be detected by at least one corresponding gaze sensor 115 and mapped to increase/decrease volume; crossing of eyes (or wink) can be detected by at least one other gaze sensor 115 and mapped to snapping a selfie; looking up-left for some period of time can be detected by some of the gaze sensors 115 and mapped to a command to summon a voice assistant. Some other user's hands-free operations are also possible based on detection of user's gaze vector by the gaze sensors 115.

Various methods of control can be implemented in relation to the gaze sensors 115 mounted on the frame 105 of the headset 100. In one embodiment, gazing long enough at a specific gaze sensor 115 would confirm activation of a control associated with that specific gaze sensor 115. In another embodiment, gazing in a first direction (e.g., up-center gaze direction) would activate all controls implemented at the headset 100, whereas gazing in a second direction opposite to the first direction (e.g., down gaze direction) would select one single control (out of multiple activated controls) of the headset 100 that is associated with a corresponding gaze sensor 115.

The controller 120 may control operations of one or more components of the headset 100 including the gaze sensors 115. The controller 120 may be coupled (i.e., interfaced) with the gaze sensors 115. The controller 120 may monitor signals detected by the gaze sensors 115, and determine, based on the monitored signals, that the user's gaze vector (i.e., user's eye gaze) is within the threshold distance from a specific gaze sensor 115. The controller 120 may initiate at least one action (or functional operation) of the headset 100 based on the determination that the gaze vector is within the threshold distance from the gaze sensor 115. For example, the controller 120 may initiate playing/pausing music, playing next/previous track, adjusting volume of audio content, snapping a selfie, summoning a voice assistant, adjusting an optical power associated with at least a portion of the lens 110, some other action/operation, or combination thereof. In some embodiments, the controller 120 may control operations of components of an audio system integrated into the headset 100 (not shown in FIG. 1A). The controller 120 may include a communication module (e.g., a transceiver) for data communication (e.g., wireless communication) with some other external component(s), e.g., a server and/or a console (not shown in FIG. 1A).

Figure 1B:
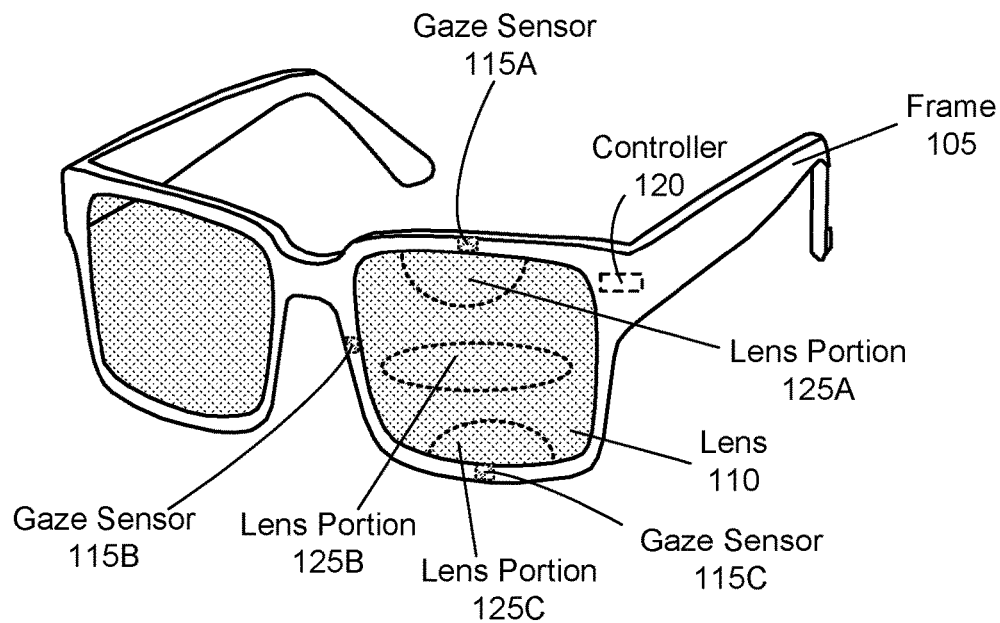
FIG. 1B illustrates portions of a lens of the headset in FIG. 1A with different focal distances adjusted based on a user's gaze vector detected by the gaze sensors.

FIG. 1B illustrates portions of the lens 110 with different focal distances adjusted based on a user's gaze vector detected by gaze sensors 115A, 115B, 115C. The gaze sensors 115A-C are embodiments of the gaze sensor 115. For example, after a user's gaze vector is at a lens portion 125A, the controller 120 may determine that the gaze vector is within a threshold distance from the gaze sensor 115A based on a signal detected by the gaze sensor 115A and provided to the controller 120 (and in some embodiments—the signals from the other gaze sensors). The controller 120 can then decide on what action to be performed, based on some or all the signals received by the controller 120. Based on the determination, the controller 120 may initiate at least one action in relation to the lens 110. For example, a focal distance of the lens portion 125A may be set to a far field, i.e., the controller 120 may instruct the lens 110 to decrease an optical power of the lens portion 125A to a first diopter in order to accommodate the user looking into a far object.

After the user's gaze vector is at a lens portion 125B, the controller 120 may determine that the gaze vector is within the threshold distance from a gaze sensor 115B based on a signal detected by the gaze sensor 115B and provided to the controller 120 (and in some embodiments—the signals from the other gaze sensors). Then, based on the determination, a focal distance of the lens portion 125B may be set to an appropriate value, e.g., to accommodate the user's optical prescription. In some cases, the controller 120 may not initiate any change to an optical power (i.e., focal distance) of the lens portion 125B, e.g., after the focal distance of the lens portion 125B is already at the appropriate value. After the user's gaze vector is at a lens portion 125C, the controller 120 may determine that the gaze vector is within the threshold distance from a gaze sensor 115C based on a signal detected by the gaze sensor 115C and provided to the controller 120 (and in some embodiments—the signals from the other gaze sensors). Then, based on the determination, a focal distance of the lens portion 125C may be set to a near field, i.e., the controller 120 may instruct the lens 110 to increase an optical power of the lens portion 125C to a second diopter in order to accommodate the user looking into a near object (e.g., reading). Thus, the headset 100 can select auto-focal depths based on, e.g., the pupil position near frame edges. Note that the gaze sensors 115A-115C operate more as coarse gaze trackers than the 'gaze-into' detectors. Thus, the coarse gaze tracking scheme is implemented herein using a relatively small number of gaze sensors instead of a whole eye-tracking array or a complex camera device.

Figure 1C:
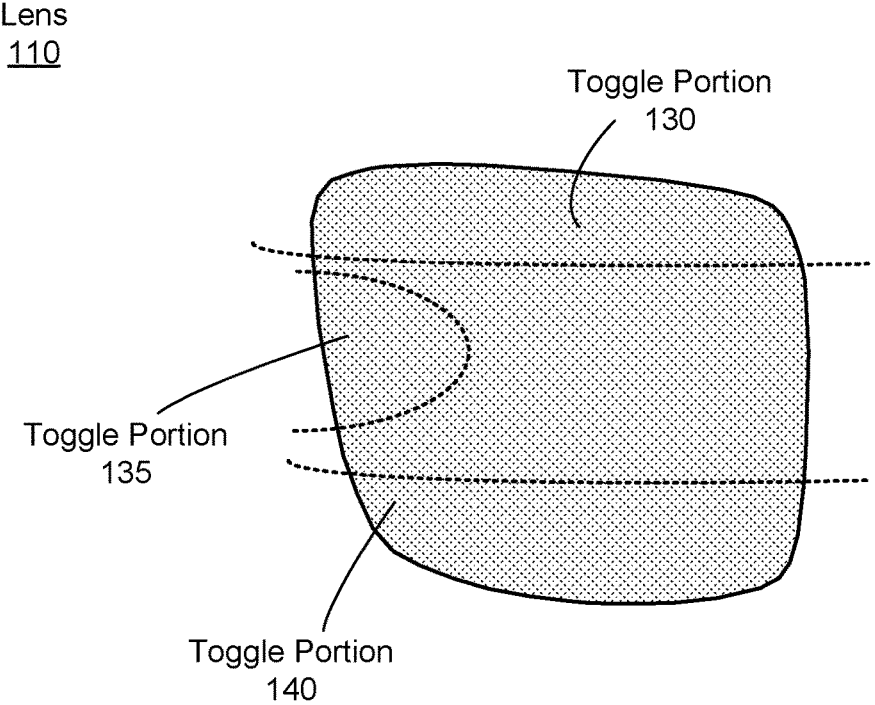
FIG. 1C illustrates the lens of the headset in FIG. 1A with different toggle focus portions activated based on a direction of a user's gaze vector detected by the gaze sensors.

FIG. 1C illustrates the lens 110 with different toggle focus portions activated based on a direction of a user's gaze vector detected by the gaze sensors 115, in accordance with one or more embodiments. After the user's gaze vector is at a toggle portion 130, the controller 120 may initiate (e.g., based on a first signal from a corresponding gaze sensor 115 indicating that the gaze vector is at the toggle portion 130) toggling to a far field by decreasing an optical power of the toggle portion 130. After the user's gaze vector is at a toggle portion 135, the controller 120 may initiate (e.g., based on a second signal from a corresponding gaze sensor 115 indicating that the gaze vector is at the toggle portion 135) toggling to an intermediate field by appropriately adjusting an optical power of the toggle portion 135. Finally, after the user's gaze vector is at a toggle portion 140, the controller 120 may initiate (e.g., based on a third signal from a corresponding gaze sensor 115 indicating that the gaze vector is at the toggle portion 140) toggling to near field by increasing an optical power of the toggle portion 140.

FIG. 2A illustrates an example 200 for a direction of a user's gaze vector 205 relative to a location of a gaze sensor 115 integrated into the frame 105 and a corresponding sensor view 210, in accordance with one or more embodiments. The gaze sensor 115 may be located in the frame 105 as shown in FIG. 2A. Alternatively, the gaze sensor 115 may be located so that the gaze sensor 115 projects/detects through the lens 110. The gaze sensor 115 is configured to exploit bright pupil effect in order to detect 'how centered' a pupil 215 of a user's eye 220 is along an axis of the gaze sensor 115. Note that, for the bright pupil effect, there should be on-axis light emitted from the gaze sensor 115. Thus, once the eye 220 is looking at the gaze sensor 115, a retina of the eye 220 retroreflects the emitted light toward the gaze sensor 115.

In the example 200 of FIG. 2A, the gaze vector 205 is positioned off the axis of the gaze sensor 115. Thus, the gaze sensor 115 (e.g., implemented as a 2D images) 'sees' the pupil 215 through a reduced cross-sectional aperture because a smaller amount of tracking light returns back to the gaze sensor 115 after reflection from the pupil 220, thus resulting in the sensor view 110 having an elliptical view 225 for the pupil 215. It should be also noted that if the direction of the user's gaze vector 205 was up but left to the gaze sensor 115, the view of the pupil 215 would become elliptical along a different axis in comparison to the elliptical view 225.

FIG. 2B illustrates an example 230 for a direction of a user's gaze vector 235 relative to a location of the gaze sensor 115 and a corresponding sensor view 240, in accordance with one or more embodiments. In the example 230 of FIG. 2B, the gaze vector 235 is positioned along an axis of the gaze sensor 115. Thus, the gaze sensor 115 'sees' a circular view 245 (i.e., maximum view) of the pupil 215 because most of tracking light returns to the gaze sensor after reflection from the pupil 215 compared to other directions of the gaze vector 235. In such case, a percentage of the tracking light detected at the gaze sensor 115 is above a threshold level. The examples 200, 230 are related to up/down eye orientations relative to the gaze sensor 115. However, the same conclusions in relation to sensor's views are valid for left/right eye orientations and other orientations relative to the gaze sensor 115.

Once the detected view of the pupil 215 is the circular view 245 (i.e., the percentage of tracking light detected at the gaze sensor 115 is above the threshold level), the gaze vector 235 is within a threshold distance from the gaze sensor 115 and the eye 220 can be considered as looking within a particular area. Also, by mapping a shape of the pupil 215 to different eye positions, the gaze sensor 115 can perform rough eye tracking (with better resolution if multiple gaze sensors 115 are utilized).

Figure 3A:
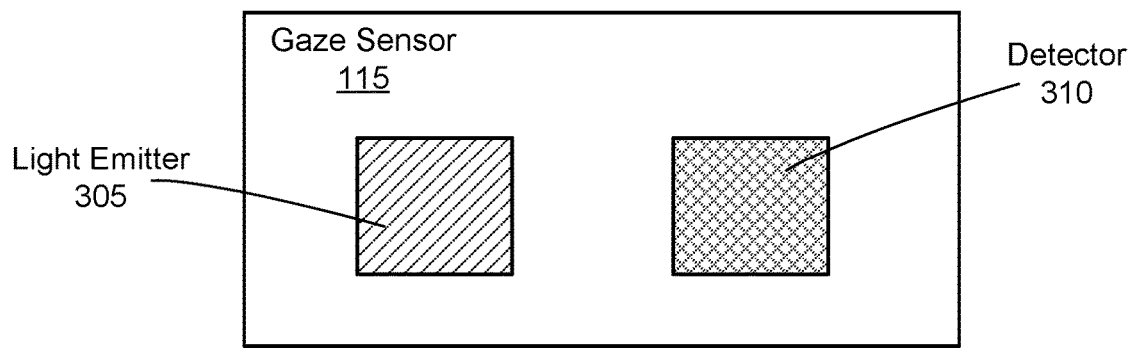
FIG. 3A illustrates an example of a gaze sensor of the headset in FIG. 1A.

FIG. 3A illustrates an example 300 of a gaze sensor 115, in accordance with one or more embodiments. The gaze sensor 115 shown in FIG. 3A is implemented as a package of combined light emitter 305 and a detector 310.

The light emitter 305 is configured to emit tracking light. The light emitter 305 may be, e.g., a LED, mini-LED, micro-LED, VCSEL, some other emitter of tracking light, or some combination thereof. The light emitter 305 may emit in the IR band. The light emitter may be a narrow band emission source.

The detector 310 detects a version of the emitted tracking light reflected from at least one surface of an eye. The detector 310 may be a photodiode, photoresistor, some other type of light detector, or some combination thereof. The detector 310 may operate as an IR detector. In one or more embodiments, an IR filter (not shown in FIG. 3A) may be located in front of the detector 310 to restrict ambient noise. When the user's pupil is gazing at the light emitter 305/detector 310 pair, an amount of light reflected from the pupil and returned to the detector 310 is maximized, which is detected as a 'gaze-into' event (e.g., by the controller 120). In some cases, the detected 'gaze-into' event (e.g., maximum light signal detected at the detector 310) may be outlier, i.e., certain anomaly may be detected. To avoid this, the detector 310 may be configured to reject ambient light (e.g., sunlight), i.e., by placing an appropriate filter in front of the detector 310. The gaze sensor 115 having the light emitter 305 operating in combination with the detector 310 can sense a user's bright pupil continuously while providing advantages related to implementation simplicity, smaller form factor and low power consumption.

In some embodiments, the light emitter 305 and the detector 310 are coaxially aligned (i.e., implemented as co-incident components). In such cases, tracking light emitted from the light emitter 305 and traveling along an optical axis reflects from the eye and propagates back along the same optical axis to be detected by the detector 310. Alternatively (not shown in FIG. 3A), the gaze sensor 115 can be implemented as a single device (i.e., combined light emitter/detector) with light emission and detection operations time-multiplexed to emit tracking light and receive reflected light during different time periods.

Figure 3B:
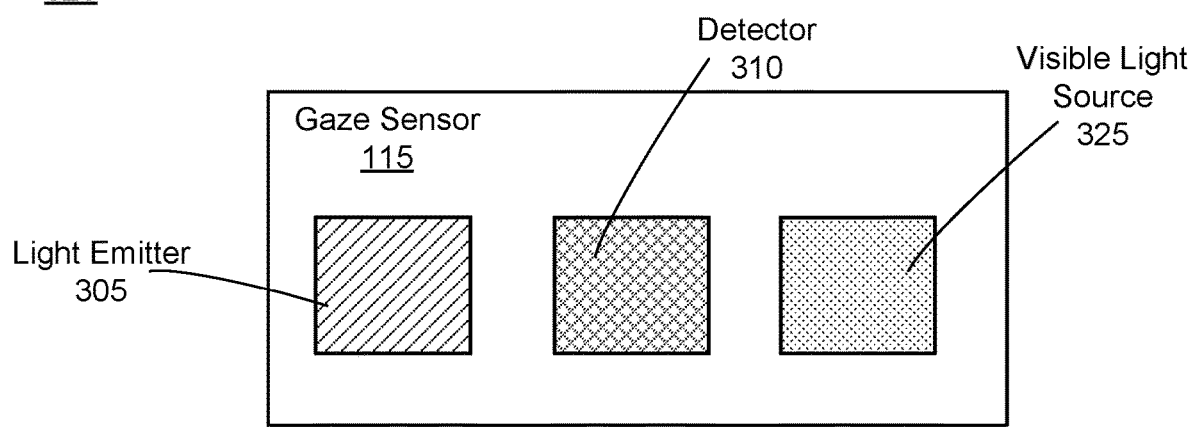
FIG. 3B illustrates an example of a gaze sensor of the headset in FIG. 1A with an integrated visible light source (e.g., a static or dynamic display element).

FIG. 3B illustrates an example 320 of a gaze sensor 115 with an integrated visible light source 325, in accordance with one or more embodiments. The gaze sensor 115 in FIG. 3B includes the light emitter 305, the detector 310, and the integrated visible light source 325.

The visible light source 325 emits light in the visible band, e.g., based on instructions from the controller 120. The visible light source 325 may be implemented as a visual feedback LED (i.e., visible LED) that indicates whether the 'gaze-into' event is detected (e.g., by the controller 120) at the gaze sensor 115. The emitted light in the visible band may be of a tunable wavelength. Alternatively, the emitted light in the visible band may be composed of multiple colors (e.g., green, blue and/or red). The emitted light in the visible band may be collimated, e.g., by a recessed channel 345 illustrated in FIG. 3D, a lens, a collimator, a grating, a baffle, some other optics embedded into the frame restricting an eye box of the gaze sensor 115, or combination thereof.

Responsive to the determination that a user's gaze vector is within a threshold distance of the gaze sensor 115, the visible light source 325 is instructed (e.g., by the controller 120) to emit visible collimated light towards the user's eye. In one embodiment, the visible light source 325 (e.g., visual feedback LED) can be normally turned on (i.e., being active without blinking), and blink only when the 'gaze-into' event is detected. Alternatively, in another embodiment, the visible light source 325 (e.g., visual feedback LED) can be normally turned off, and turned on only when the 'gaze-into' event is detected. It should be noted that the relative placement of the light emitter 305, the detector 310 and the visible light source 325 can be chosen to minimize the cross-talk. For example, to minimize the cross-talk, the visible light source 325 (e.g., visual feedback LED) can be placed between the light emitter 305 and the detector 310. In one or more embodiments, the visible light source 325 is implemented as a static display element that presents static images, e.g., in accordance with display instructions from the controller 120. In one or more other embodiments, the visible light source 325 is implemented as a dynamic display element that dynamically updates a displayed image, e.g., in accordance with display instructions from the controller 120.

Figure 3C:
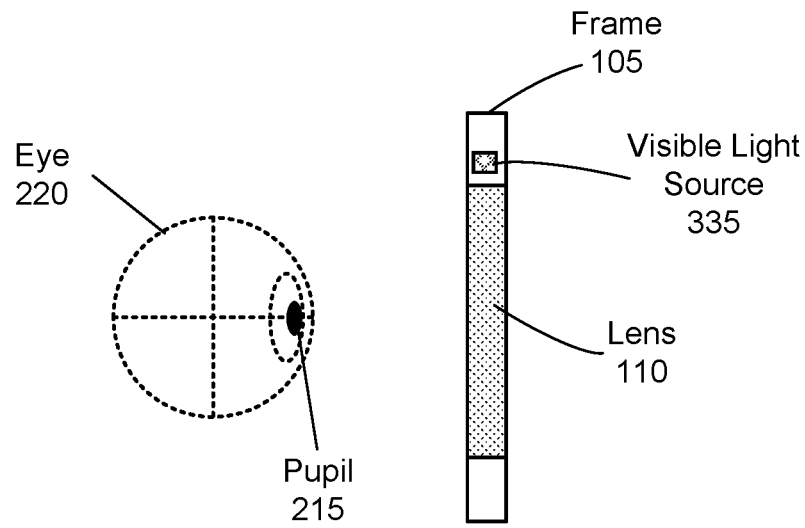
FIG. 3C illustrates an example visible light source (e.g., a static or dynamic display element) integrated into the frame of the headset in FIG. 1A.

FIG. 3C illustrates an example 330 of a visible light source 335 integrated into the frame 105, in accordance with one or more embodiments. The visible light source 335 may emit visible light toward the pupil 215 of the user's eye 220 independently of any gaze sensor 115. The visible light source 335 may be positioned within the frame 105 such that the user can see light emitted from the visible light source 335 in the periphery of a user's field of view. Alternatively, the visible light source 335 may be positioned within the frame 105 such that the user can gaze into the visible light source 335 in order to bring the visible light source 335 into the user's field of view. The controller 120 may provide display instructions to the visible light source 335 for configuring the visible light source 335 to display information associated with, e.g., a status of the headset 100, a status of at least one feature of the headset 100, or a status of a device paired with the headset 100 (e.g., a smartphone, console, etc.). The visible light source 335 may be implemented as a static display element, a dynamic display element, a timer (e.g., an analog clock or digital clock), or combination thereof.

Figure 3D:
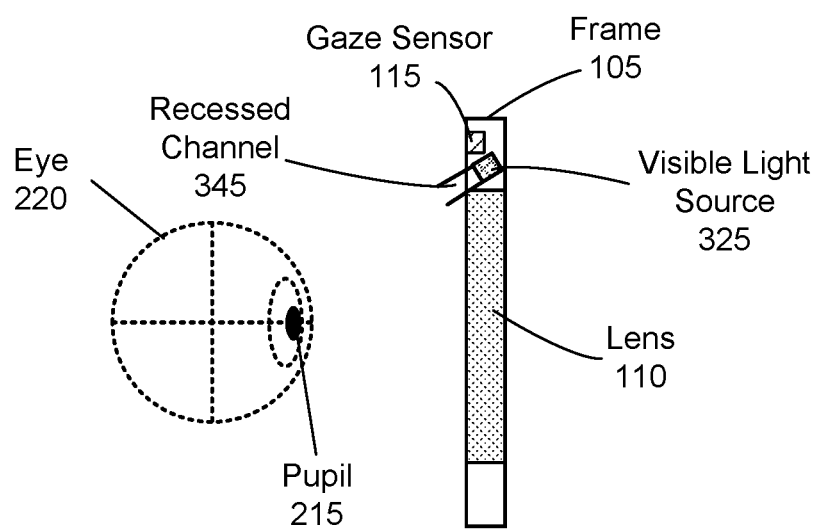
FIG. 3D illustrates an example recessed and collimated visible light source (e.g., a static or dynamic display element) co-located with a gaze sensor on a frame of the headset in FIG. 1A.

Referring back to FIG. 3B, in order to increase visual feedback in the case of alignment of a gaze vector with an axis of the gaze sensor 115, the visible light source 325 can be recessed and collimated in order to only be visible after the gaze vector is sufficiently aligned with the gaze sensor 115, i.e., after the gaze vector is within a threshold distance from the axis of the gaze sensor 115. FIG. 3D illustrates an example of the recessed and collimated visible light source 325 co-located with the gaze sensor 115 on the frame 105 of the headset 100, in accordance with one or more embodiments. The visible light source 325 (e.g., visual feedback LED) is visible after a gaze vector of the pupil 215 is being close (e.g., within a threshold distance) to a propagation axis of pseudo-collimated light exiting a recessed channel 345. A gaze sensor 115 having recessed collimation with a visual feedback LED may be more robust against 'gaze into' false flags. In some embodiments (not shown in FIG. 3D), the gaze sensor 115 of FIG. 3B with the integrated visible light source 325 is located at the end of the recessed channel 345.

Figure 4A:
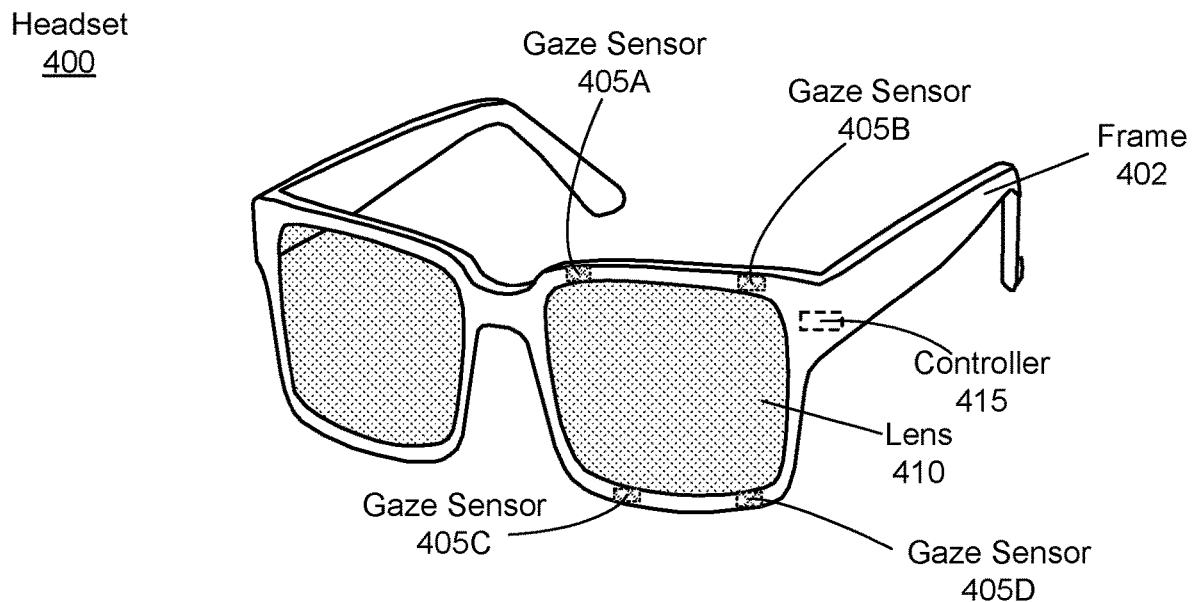
FIG. 4A illustrates a headset with gaze sensors mounted at different positions of a frame around a lens of the headset, in accordance with one or more embodiments.

FIG. 4A illustrates a headset 400 (e.g., smart electronic eyeglasses) with gaze sensors 405A-405D mounted at different positions of a frame 402 around a lens 410 of the headset 400, in accordance with one or more embodiments. The gaze sensors 405A-405D may be embodiments of the gaze sensors 115. The controller 415 is interfaced with the gaze sensors 405A-405D and monitor signals detected at the gaze sensors 405A-405D. Each gaze sensor 405A-405D can detect, for a specific direction for a user's gaze vector, a corresponding signal associated with light previously emitted from that gaze sensor 405A-405D and reflected from at least one surface (e.g., pupil) of a user's eye. For example, in one embodiment once the user's pupil gazes at a center of the lens 410 (i.e., after the gaze vector is within a threshold distance from the center of the lens 410), all four signals detected at the gaze sensors 405A-405D over time are below a defined threshold level and are substantially similar with noise and ambient constant background signals. Thus, the controller 415 monitoring the signals detected by the gaze sensors 405A-405D cannot distinguish the monitored signals from the noise and ambient constant background signals. Hence, as the gaze vector is not within a threshold distance from each of the gaze sensors 405A-405D, the controller does not detect any 'gaze event.'

In some embodiments, the gaze sensors 405A-405D operate substantially the same as an array of photodiodes used for coarse eye-tracking. In such cases, the gaze sensors 405A-405D may not rely on the interaction with the bright pupil effect, but rather on the collection of light signals from the gaze sensors 405A-405D that corresponds uniquely to different eye orientations. The mapping from the light signals collected at the gaze sensors 405A-405D to a specific eye orientation may be based on the pre-calibration using eye surfaces for different users, and thus would be generally applicable across a set of pre-calibrated users.

Figure 4B:
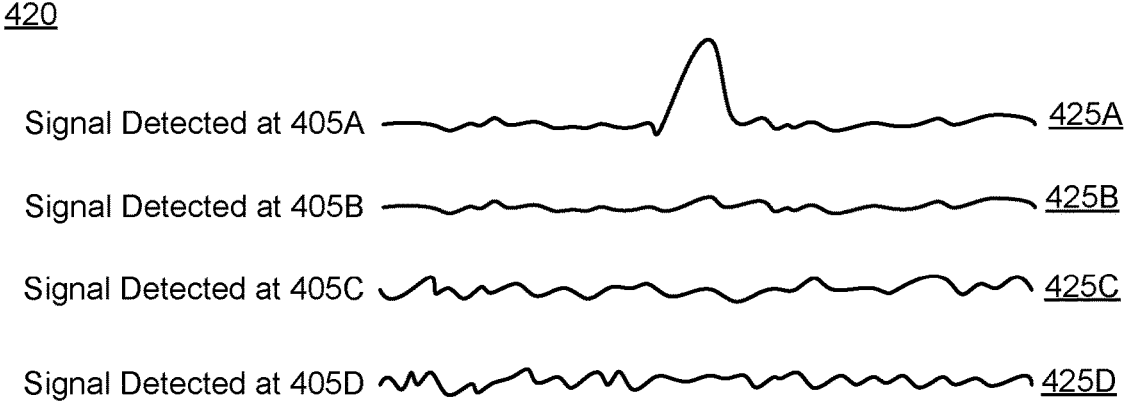
FIG. 4B illustrates a graph of signals detected at the gaze sensors in FIG. 4A for a specific direction of a user's gaze vector.

FIG. 4B illustrates a graph 420 with signals detected at the gaze sensors 405A-405D for a specific direction of the user's gaze vector, in accordance with one or more embodiments. In this particular case, the user's gaze vector is within the threshold distance from the gaze sensor 405A, i.e., the user's pupil gazes at the gaze sensor 405A. The controller 415 monitors signals 425A-425D detected at the gaze sensors 405A-405D. After the signal 425A detected at the gaze sensor 405A is greater than the defined threshold level (at some point in time), the controller 415 can differentiate the signal 425A from signals 425B-425D detected at the other gaze sensors 405B-405D, as well as from the noise and ambient constant background signals. Thus, the controller 415 can detect not only that the 'gaze event' occurred, but also that the gaze vector has a specific direction.

If the gaze vector moves away from the gaze sensor 405A and back toward the center of the lens 410, the signal 425A detected at the gaze sensor 405A would decrease below the threshold level, and the controller 415 would not be able to differentiate the signal 425A from signals 425B-425D, i.e., the 'gaze event' would not be detected. On the other hand, if the gaze vector moves away from the gaze sensor 4105A and toward another gaze sensor (e.g., the gaze sensor 405B), the signal 425A detected at the gaze sensor 405A would decrease below the threshold level, whereas the signal 425B detected at the gaze sensor 405B would increase (at some point in time) above the threshold level. In such case, the controller 415 would able to differentiate the signal 425B from signals of other gaze sensors, i.e., the 'gaze event' at the gaze sensor 405B would be detected.

Figure 5A:
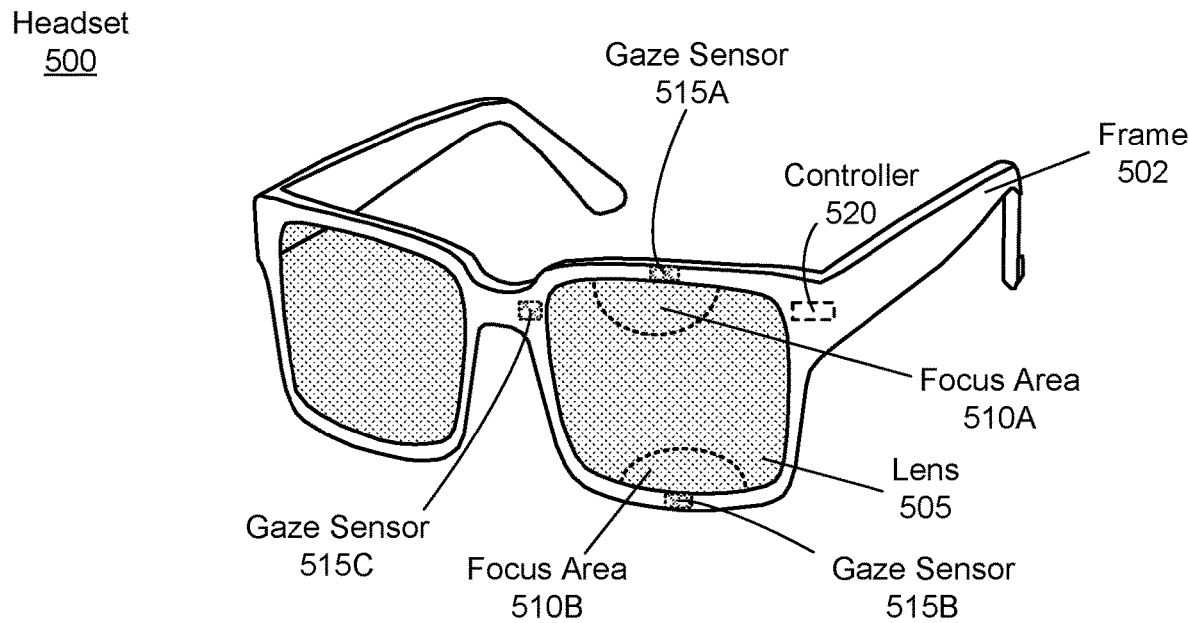
FIG. 5A illustrates a headset with gaze sensors mounted at different positions on a frame around a lens of the headset, in accordance with one or more embodiments.

FIG. 5A illustrates the headset 100 with gaze sensors 515A-515C mounted at different positions on a frame 502 around a lens 505, in accordance with one or more embodiments. The gaze sensors 515A-515C may be embodiments of the gaze sensors 115. At least some of the gaze sensors 515A-515C (e.g., gaze sensors 515A and 515B) are associated with adjustable focus areas of the lens 505, e.g., focus areas 510A, 510B, as illustrated in FIG. 5A. Alternatively, a focus of the entire lens 505 is adjustable at once. A focus area is a region of the lens 505 that has an adjustable optical power (i.e., may change its focus). For example, the focus area may include a liquid lens that is able to change its curvature (i.e., focus) in accordance with instructions from the controller 520. The controller 520 integrated into the frame 502 is interfaced with the gaze sensors 515A-515C and monitor light signals detected at the gaze sensors 515A-515C. Each gaze sensor 515A-515C can detect, for a specific direction for a user's gaze vector, a corresponding light signal associated with light previously emitted from that gaze sensor 515A-515C and reflected from at least one surface (e.g., pupil) of a user's eye.

Responsive to a light signal detected at the gaze sensor 515A being at or above a threshold intensity level (which is monitored by the controller 520), the controller 520 may initiate an action in relation to the lens 505. Note that, in one or more embodiments, the controller 520 may take into account one or more signals from one or more other gaze sensors (e.g., gaze sensor 515B and/or gaze sensor 515C). In some embodiments, the controller 520 may initiate a transition of a focal distance of the focus area 510A and/or the entire lens 505 into a far field, i.e., the transition to a diopter having a negative value less than a threshold value. In one or more embodiments, to initiate the transition of the focal distance, the controller 520 may provide a varifocal instruction (e.g., a defined voltage level) to a liquid lens associated with the focus area 510A and/or the entire lens 505 so that a curvature of the liquid lens is appropriately modified. This case corresponds to the user's gaze vector being at a top portion of the lens 505, i.e., within the focus area 510A that also corresponds to an area within a threshold distance from the gaze sensor 515A. In some embodiments, the light signal may need to be detected during at least a threshold period of time before the controller 520 initiates the transition of the focal distance. Otherwise, if the user glances into a focus area of the lens 505, it could cause an unintended transition of the focal distance.

Responsive to a light signal detected at the gaze sensor 515B being at or above a threshold intensity level (which is monitored by the controller 520), the controller 520 may initiate another action in relation to the lens 505. Note that, in one or more embodiments, the controller 520 may take into account one or more signals from one or more other gaze sensors (e.g., gaze sensor 515A and/or gaze sensor 515C). In some embodiments, the controller 520 may initiate a transition of a focal distance of the focus area 510B and/or the entire lens 505 into a near field, i.e., the transition to a diopter having a positive value greater than a threshold value. In one or more embodiments, to initiate the transition of the focal distance, the controller 520 may provide a varifocal instruction (e.g., a defined voltage level) to a liquid lens associated with the focus area 510B and/or the entire lens 505 so that a curvature of the liquid lens is appropriately modified. This case corresponds to the user's gaze vector being at a bottom portion of the lens 505, i.e., within the focus area 510B that also corresponds to an area within a threshold distance from the gaze sensor 515B.

Responsive to a light signal detected at the gaze sensor 515C being at or above a threshold intensity level (which is monitored by the controller 520), the controller 520 may initiate yet another action in relation to the lens 505. Note that, in one or more embodiments, the controller 520 may take into account one or more signals from one or more other gaze sensors (e.g., gaze sensor 515A and/or gaze sensor 515B). In such case, the user's gaze vector is at a mid-portion of the lens 505 (e.g., between the focus area 510A and the focus area 510B) and a focus of the mid-portion of the lens 505 between the focus area 510A and 510B (or focus of the entire lens 505) may, e.g., remain at a current level. As a direction of the user's gaze vector toggles between the focus area 510A and the focus area 510B, the controller 520 may initiate toggling of foci of the focus areas 510A, 510B (or alternatively of the entire lens 505) between corresponding settings for focal distance values.

Figure 5B:
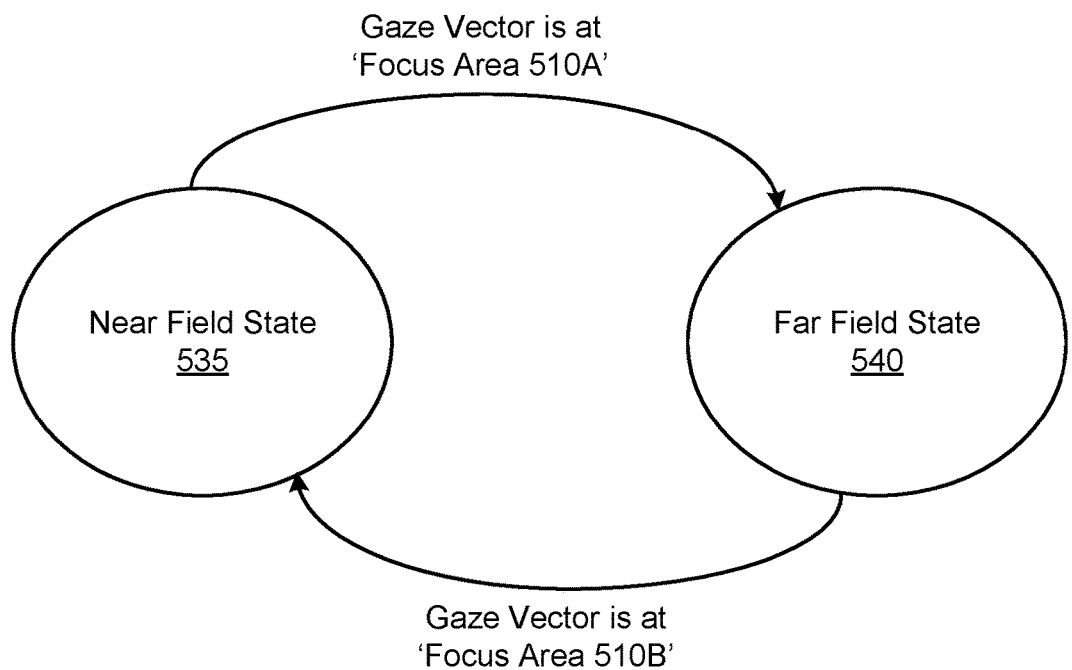
FIG. 5B illustrates example transitions between different focus states of the lens of the headset in FIG. 5A.

FIG. 5B illustrates an example 530 of transitions between a pair of different focus states of the lens 505, in accordance with one or more embodiments. It is considered that a focal distance of the entire lens 505 would toggle between corresponding settings for focal distance values associated with near and far fields. At a focus state 535, a focus of the lens 505 is set to a focus value corresponding to a near field, which can be referred as a 'near field state' 535 of the lens

505. At the focus state 535, the user's eye gaze may be focused at the near field, e.g., the user may be reading or otherwise looking at a close object. After the user starts looking at a far field (e.g., stops reading and starts looking at a further object), a user's gaze vector (e.g., pupil's gaze) approaches a top portion of the lens 505 (e.g., the gaze vector is at the focus area 510A), a light signal detected at the gaze sensor 515A (which is monitored by the controller 520) reaches a threshold intensity level. After the user's gaze vector is at the focus area 510A for a threshold amount of time, the controller 520 may initiate a change of the state of lens 505 from the focus state 535 to a focus state 540 by initiating a transition of the focus of the lens 505 to a focus value corresponding to a far field, which can be referred as a 'far field state' of the lens 505. After the user's gaze vector (e.g., pupil's gaze) approaches a bottom portion of the lens 505 (e.g., the gaze vector is again at the focus area 510B), a light signal detected at the gaze sensor 515B (which is monitored by the controller 520) reaches a threshold intensity level. After the user's gaze vector is at the focus area 510B for a threshold amount of time, the controller 520 may initiate a change of the state of lens 505 from the focus state 540 back to the focus state 535 by initiating a transition of the focus of the lens 505 back to a focus value corresponding to the near field. Thus, the lens 505 toggles between the 'near field state' 535 and the 'far field state' 540.

Referring back to FIG. 5A, a nasal gaze sensor 515C may be configured to trigger an intermediate focus state for the lens 505 after the user's gaze vector is at a region within a threshold distance from the gaze sensor 515C. For example, the nasal gaze sensor 515C can be reached smoothly by the user gazing a target while turning head either left or right (or crossing eyes). In such case, a light signal detected at the gaze sensor 515C (which is monitored by the controller 520) reaches a threshold intensity level. The activation of the nasal gaze sensor 515C may correspond to the case when the user wearing the headset 500 gazes at, e.g., a computer screen. Thus, the intermediate focus state for the lens 505 may correspond to initiating (e.g., by the controller 520) a transition to a focal distance of the lens 505 to e.g., a computer screen distance.

In some embodiments, additional information may be generated by time multiplexing light emitters and detectors from different gaze sensors, e.g., a light emitter from the gaze sensor 515A can be paired with a detector from the gaze sensor 515C (and/or a detector from the gaze sensor 515B). By time multiplexing a light emitter from one gaze sensor and a detector from another gaze sensor, it is possible to generate different combination of bright, dark, or differential eye images.

In some embodiments, SMI based gaze sensors can be utilized herein for determination of a direction of a user's gaze vector. For example, any of the gaze sensors 515A-515C can be implemented as an SMI based gaze sensor. An SMI based gaze sensor includes a light emitter (e.g., VCSEL) and a detector (e.g., photodiode) that are in an interferometric configuration such that the detector is configured to detect a mixed signal corresponding to mixed light formed from reference light emitted from the light emitter mixing with a portion of sensing light emitted from the light emitter that was reflected and scattered from at least one surface of a user's eye. When an SMI based gaze sensor is used, an increased depth to a back of a retina when the SMI based gaze sensor points though a pupil would be a strong indication of a user's eye gaze. Alternatively or additionally, a combined VCSEL/SMI gaze sensor may also be used herein for determination of a direction of a user's gaze vector.

Figure 6:
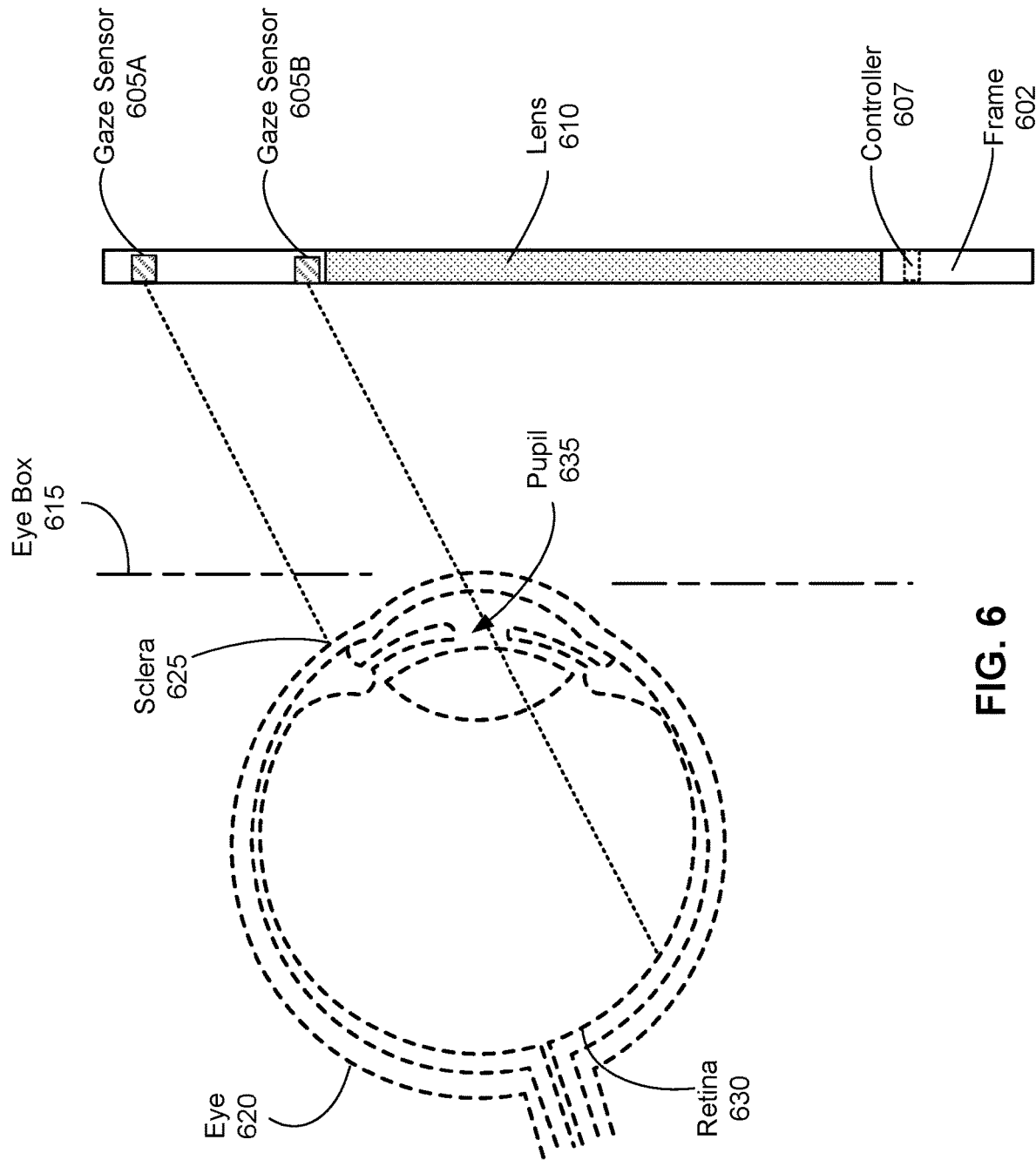
FIG. 6 illustrates an example configuration of a pair of gaze sensors implemented as self-mixing interferometer (SMI) based gaze sensors for tracking different eye surfaces, in accordance with one or more embodiments.

FIG. 6 illustrates an example configuration 600 of a pair of gaze sensors 605A, 605B implemented as SMI based gaze sensors for tracking different eye surfaces in an eye box 615, in accordance with one or more embodiments. The gaze sensors 605A, 605B may be embodiments of the gaze sensors 115. The eye box 615 is a region in space that would be occupied by an eye 620 of a user. The pair of gaze sensors 605A, 605B may be integrated into a frame 602 of a headset (e.g., the headset 100). The pair of gaze sensors 605A, 605B may be applied for detection of a user's gaze vector. For example, for an initial position of the eye 620 in the eye box 615, the gaze sensor 605A may detect a shorter distance to a sclera 625 of the eye 620, whereas the gaze sensor 605B may detect a greater distance to a retina 630 of the eye 620. If a direction of the gaze vector moves up (e.g., gaze of a pupil 635 moves up), the gaze sensor 605A may align with the retina 630, whereas light emitted from the gaze sensor 605B would hit the sclera 625. Thus, for this new position of the eye 620 in the eye box 615, the gaze sensor 605A may detect a distance to the retina 630, whereas the gaze sensor 605B may detect a distance to the sclera 625. In this manner, different combinations of light signals from the two gaze sensors 605A, 605B can be mapped to specific eye positions. And, in this manner, a controller 607 integrated into the frame 602 may, e.g., determine a gaze vector for the eye 620.

Based on the geometry of the user's face with respect to the frame 602, the orientation of the gaze sensor 605A may need to be positioned such that the eye 620 (as well as other user's eye not shown in FIG. 6) is able to rotate into a position such that a field of view of the gaze sensor 605A enters the pupil 635. Relative positioning of the gaze sensor 605A may be individually adjustable at a time of manufacture or sale, or adjustable at any time by the user. Alternatively or additionally, the relative location of the frame 602 may be adjusted to bring the fixed gaze sensors 605A, 605B into alignment with corresponding surfaces of the eye 620. For example, the relative location of the frame 602 may be adjusted using an adjustable or swappable nose piece that moves the entire assembly of the frame 602 with respect to the user's face and eyes.

In some embodiments, a display element co-located to a gaze sensor provides a user wearing a headset (e.g., smart electronic eyeglasses) with a landmark for eye gestures as well as with a visual feedback signal. Alternatively, a display element may be integrated into the gaze sensor. In one or more embodiments, the gaze sensor with the co-located display element may cover a small portion of a user's field-of-view (e.g., approximately 1° to 5° of the user's field-of-view). In one or more other embodiments, the gaze sensor with the co-located display element may cover the entire eye box of user's eye. In some embodiments, the display element may be implemented as a physical icon or marking serving as a landmark for a user's gaze after the user tries to activate a 'visual button' associated with the co-located gaze sensor or other gaze-dependent user interface. In some other embodiments, the display element may be implemented as a LED emitting visible light. For example, the LED may light up after the user's gaze is detected at a co-located gaze sensor; the LED may blinks after the 'visual button' associated with the co-located gaze sensor is activated; the LED may change color or intensity of emitted light to communicate specific information after the 'visual button' is activated. A display element co-located to a gaze sensor can be recessed, restricted with a folded optical path embedded into a frame of the headset, or otherwise collimated to restrict its view to an on-axis direction. Advantages of display elements presented herein that operate in conjunction with gaze sensors are related to implementation simplicity, low power consumption, and minimal interference with lenses of the headset and the user's optical path. In some embodiments, the display element is independent of a gaze sensor and operates as a static or dynamic display element providing information to the user that is not associated with gaze sensing.

Figure 7A:
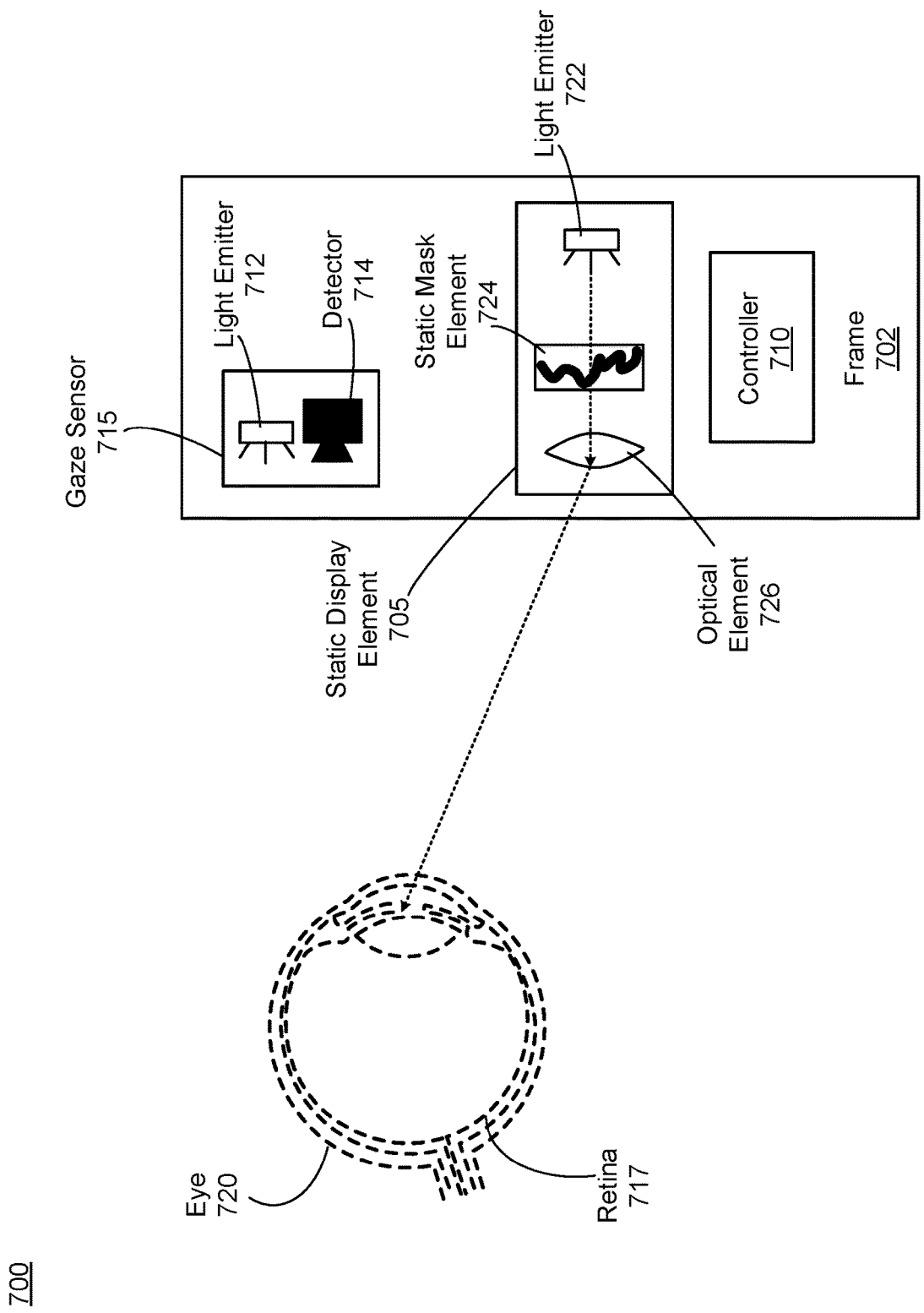
FIG. 7A illustrates an example of a static display element co-located with a gaze sensor that are both mounted on a frame of a headset, in accordance with one or more embodiments.

FIG. 7A illustrates an example 700 of a portion of a headset that includes a display element 705 configured to output a static image and a gaze sensor 715, in accordance with one or more embodiments. The display element 705 and the gaze sensor 715 are coupled to a frame 702 of a headset. Although FIG. 7A illustrates an embodiment where the display element 705 is co-located to the gaze sensor 715, the display element 705 may be embedded into the frame 702 at a location that is further away from the gaze sensor 715.

The static display element 705 presents static images in accordance with instructions from a controller 710 coupled to the static display element 705. The static display element 705 may be implemented as a holographic element that can project light (e.g., static image) onto a retina 717 of a user's eye 720. Note that the light emitted from a light emitter 712 of the gaze sensor may be out of focus. The static display element 705 may be of a small size, low cost, and suitable for integration into the frame 702. For example, the static display element 705 may be configured to display a 'play' icon, 'volume' icon (e.g., for controlling an audio system coupled to the headset), a low battery indicator, some other indicator, or combination thereof. The static display element 705 includes a light emitter 722, a static mask element 724, and an optional optical element 726.

The light emitter 722 emits light in the visible band, e.g., based on instructions from the controller 710. The light emitter 722 may be a single LED, a laser diode, VCSEL, or some other visible light emitter. The light emitter 722 may be paired with the static mask element 724. The static mask element 724 may be a patterned mask designed to modulate light from the light emitter 722 to generate a static image. A static image is an image that does not change during a time period when the light emitter 722 emits the visible light. The static mask element 724 may be implemented as, e.g., a phase modulator, an amplitude modulator, a metalens, some other type of static mask element, or combination thereof. The static mask element 724 may be implemented as a part of an optical stack with one or more lenses embedded into the frame 702. Alternatively, the static mask element 724 may be implemented as a part of a folded optics configuration built into the frame 702. The static mask element 724 may have a fixed (static) transfer function for modulating (i.e., encoding) a desired static image to be projected at the retina 717.

The optional optical element 726 may include at least one lens configured to project the static image toward the eye 720. In one or more embodiments, the optical element 726 may collimate the light emitted from the light emitter 722 so that the emitted light is visible when the user is looking at the display element 705, but the emitted light may not be visible when the user is looking away from the display element 705. Additionally, the optical element 726 may be used to position a focal plane. For example, the optical element 726 may be able to position an image plane approximately one meter in front of the user. Thus, the static image may be made to appear at a "virtual image plane" at a greater distance perceptually than a distance from the eye 720 the static display element 705 is located at.

Figure 7B:
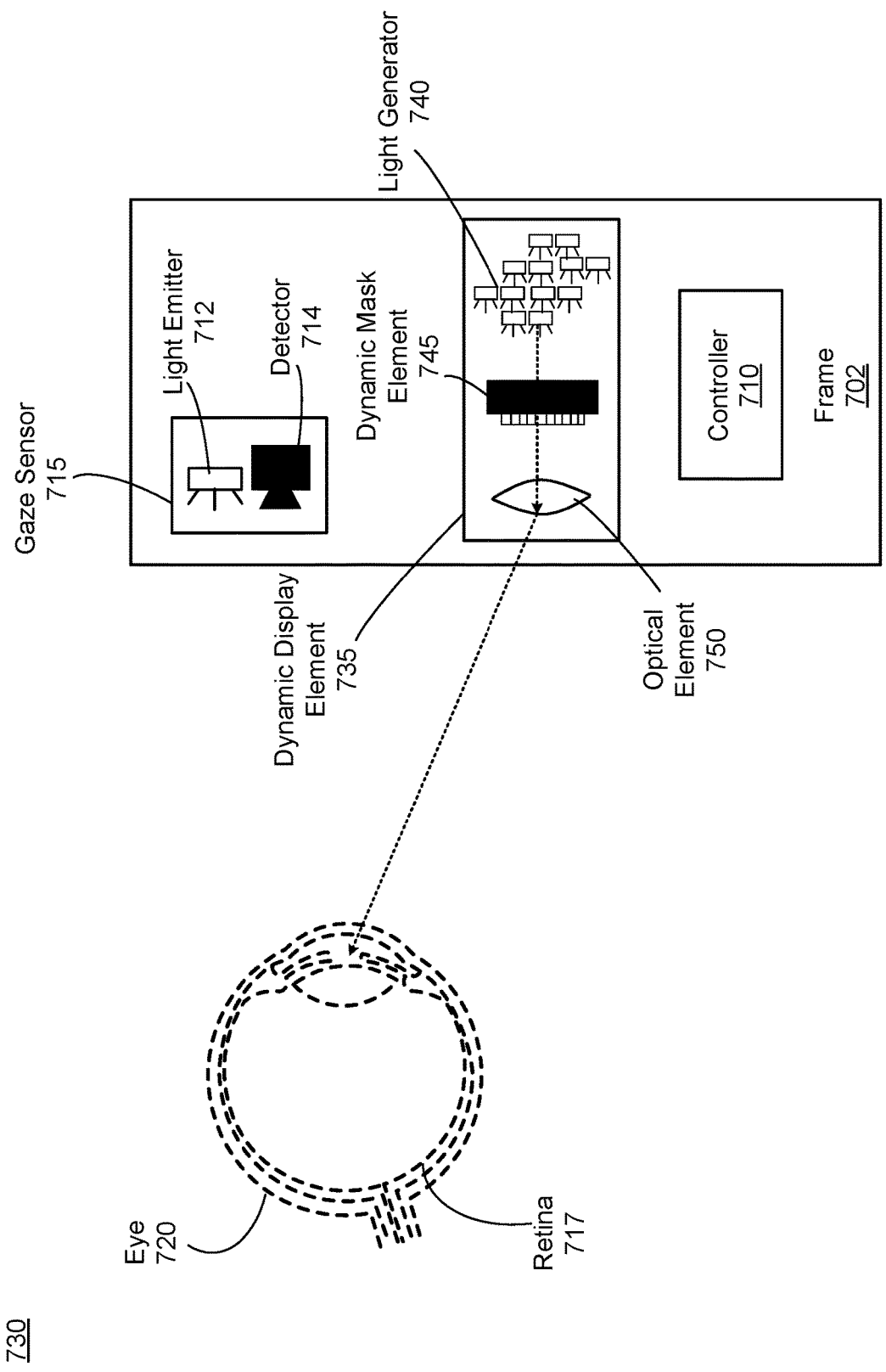
FIG. 7B illustrates an example of a dynamic display element co-located with a gaze sensor that are both mounted on a frame of a headset, in accordance with one or more embodiments.

FIG. 7B illustrates an example 730 of a portion of a headset that includes a display element 735 configured to output a dynamic image and the gaze sensor 715, in accordance with one or more embodiments. The displayed portion of the headset is substantially the same as that of FIG. 7A, except that the display element 735 is configured to output a dynamic image (vs. the static image of FIG. 7A). The dynamic display element 735 may be configured to dynamically update a displayed image focused onto the retina 717 of the user's eye 720. The dynamic display element 735 may be also of a sufficient resolution for displaying small icons and/or basic images. Although FIG. 7A illustrates an embodiment where the dynamic display element 735 is co-located to the gaze sensor 715, the dynamic display element 735 may be embedded into the frame 702 at a location that is further away from the gaze sensor 715.

The display element 735 is configured to present a dynamic image in accordance with instructions from the controller 710 coupled to the display element 735. A dynamic image is an image that can be dynamically updated during a time period when the display element 735 emits light. The dynamic image generated by the display element 735 and projected onto the retina 717 can be used, e.g., for displaying different icons (vs. the static image that can only display the same icon), icons of different colors, etc. The dynamic display element 735 may include a light generator 740, a dynamic mask element 745, and the optional optical element 750.

The light generator 740 emits light in the visible band, e.g., based on instructions from the controller 710. The light generator 740 may be implemented as a single dynamic light emitter, or an array of emitters. For example, the light generator 740 may be implemented as an array of micro-LEDs, a pinlight diode array, an organic light-emitting diode (OLED) array, a dot matrix display (DMD), a liquid crystal display (LCD), some other type of light generator, or combination thereof. The light generator 740 may be coupled with the dynamic mask element 745.

The dynamic mask element 745 is a patterned mask that is configured to dynamically modulate light in order to form different images for projection onto the retina 717 in accordance with instructions from the controller 710. The dynamic mask element 745 may be implemented as, e.g., a phase modulator, an amplitude modulator, a dynamically addressable mask array, a spatial light modulator, a metalens, some other type of dynamic mask element that dynamically modulates incident light, or combination thereof. The dynamic mask element 745 may have a dynamically variable transfer function for modulating (i.e., encoding) a desired dynamic image to be projected onto the retina 717.

The optional optical element 750 may include at least one lens configured to project the dynamic image toward the eye 720. In one or more embodiments, the dynamic display element 735 may be implemented as a small projection unit by combining the light generator 740 implemented as a micro-LED display with the optical element 750 implemented as a projection lens.

The display elements described herein (i.e., the static display element 705 and the dynamic display element 735) are combined with one or more gaze sensors 715 that detect a user's gaze before triggering or updating the display elements. A gaze sensor 715 may change the behavior of a corresponding display element based on whether the user's gaze vector is at the gaze sensor 715 or not. In some other embodiments, at least one of the display elements that are mounted on a headset may be implemented as an 'always on' display element. The 'always on' display element may be integrated into a frame of the headset as a stand-alone display element, e.g., as an always visible indicator but not associated with any particular gaze sensor 715. An example of the 'always on' display element is a low battery indicator that can be activated and turned on in the case of low power state for the headset regardless of a direction of the user's gaze vector.

In some embodiments, some of the display elements described herein (i.e., the static display element 705 and/or the dynamic display element 735) can be implemented as collimated display elements. An in-frame display element presented herein may be implemented to cover a small eye box, such that a user must rotate its eye into the eye box in order to see the display element (e.g., visual indicator). This may be used to help users self-align to the display element and/or associated gaze sensor.

Light emitted from the gaze sensor 715 (e.g., from the light emitter 712) may have wavelength(s) of near IR illumination (e.g., 850-940 nm) that is invisible to a user. Light emitted from the gaze sensor and/or light emitted from a display element (e.g., from the light emitter 712 and/or the light generator 740) may be modulated (e.g., with 38 kHz frequency modulation) to reduce interference from ambient illumination. In the case of 'always-on' display element integrated into the frame 702, at least one gaze sensor 715 may be implemented in the visible range, e.g., to actually function as an 'always-on' display element or to share its illumination with illumination of a separate 'always-on' display element. A visual wavelength gaze sensor 715 may be utilized as a preliminary 'wake-up' signal that activates a higher-robustness near IR gaze sensor to avoid erroneous measurements from ambient illumination. Alternatively or additionally, a gaze sensor 715 may emit visible light for calibration purposes. In one or more embodiments, the gaze sensing can be implemented using one or more gaze sensors 715 operating in the visible band.

Figure 7C:
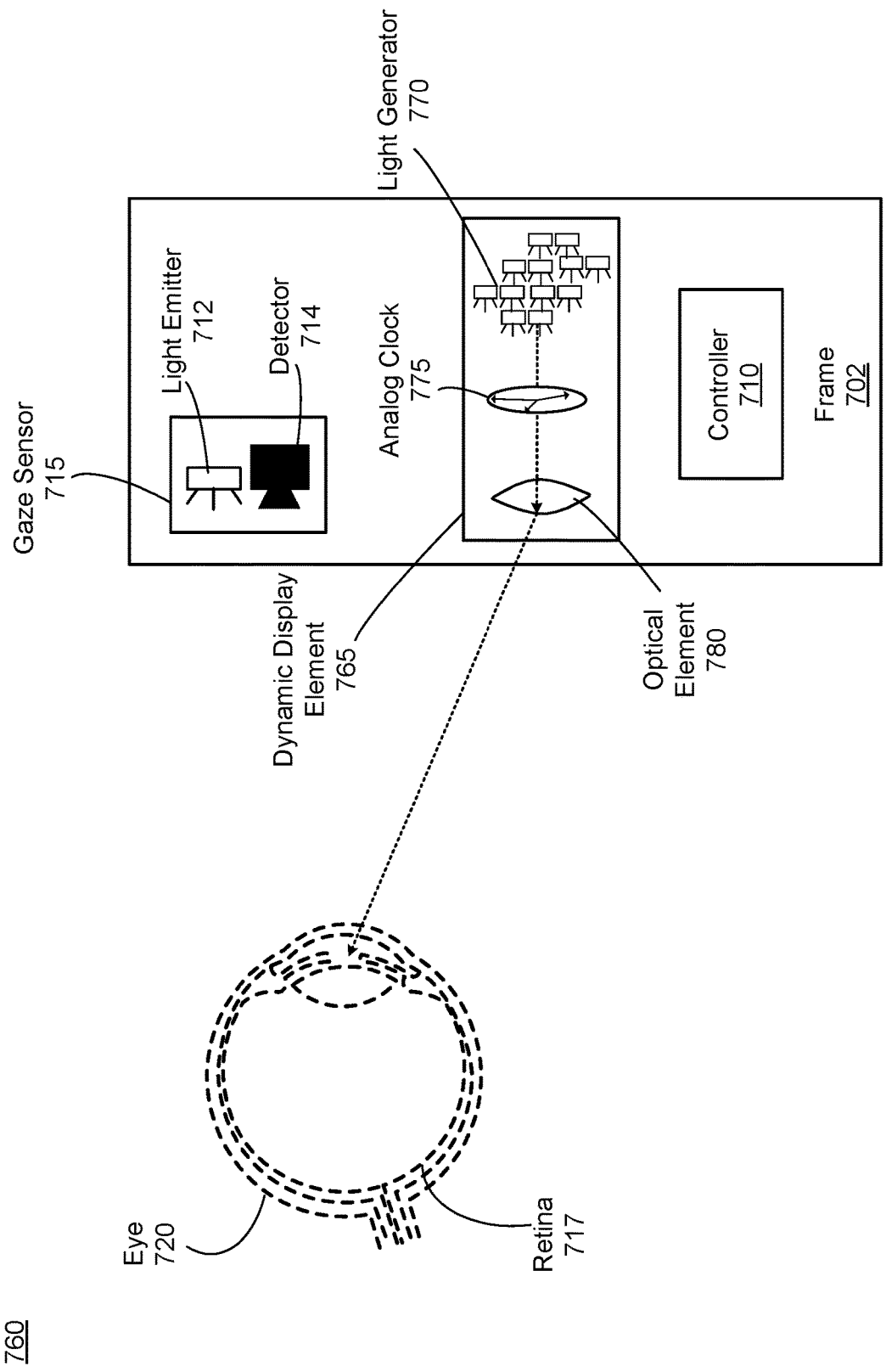
FIG. 7C illustrates an example of a dynamic display element configured to output a dynamic image of an analog clock, in accordance with one or more embodiments.

FIG. 7C illustrates an example 760 of a portion of a headset that includes a dynamic display element 765 configured to output a dynamic image of an analog clock, in accordance with one or more embodiments. The displayed portion of the headset is substantially the same as that of FIG. 7B, except that the dynamic mask element 745 is implemented as an analog clock 775 (e.g., dynamic mask that provides a dynamic image projection of second, minute, and hour hands). The dynamic display element 765 implemented as a timer may be configured to dynamically update a displayed image of analog clock focused onto the retina 717 of the user's eye 720. Light from a light generator 770 may be at least partially occluded by the analog clock 775 and pass through an optical element 780 (e.g., magnifying optic) before reaching the retina 717. The dynamic display element 765 may have quartz, mechanical, or automatic clock movements controlled by the controller 710.

Figure 8:
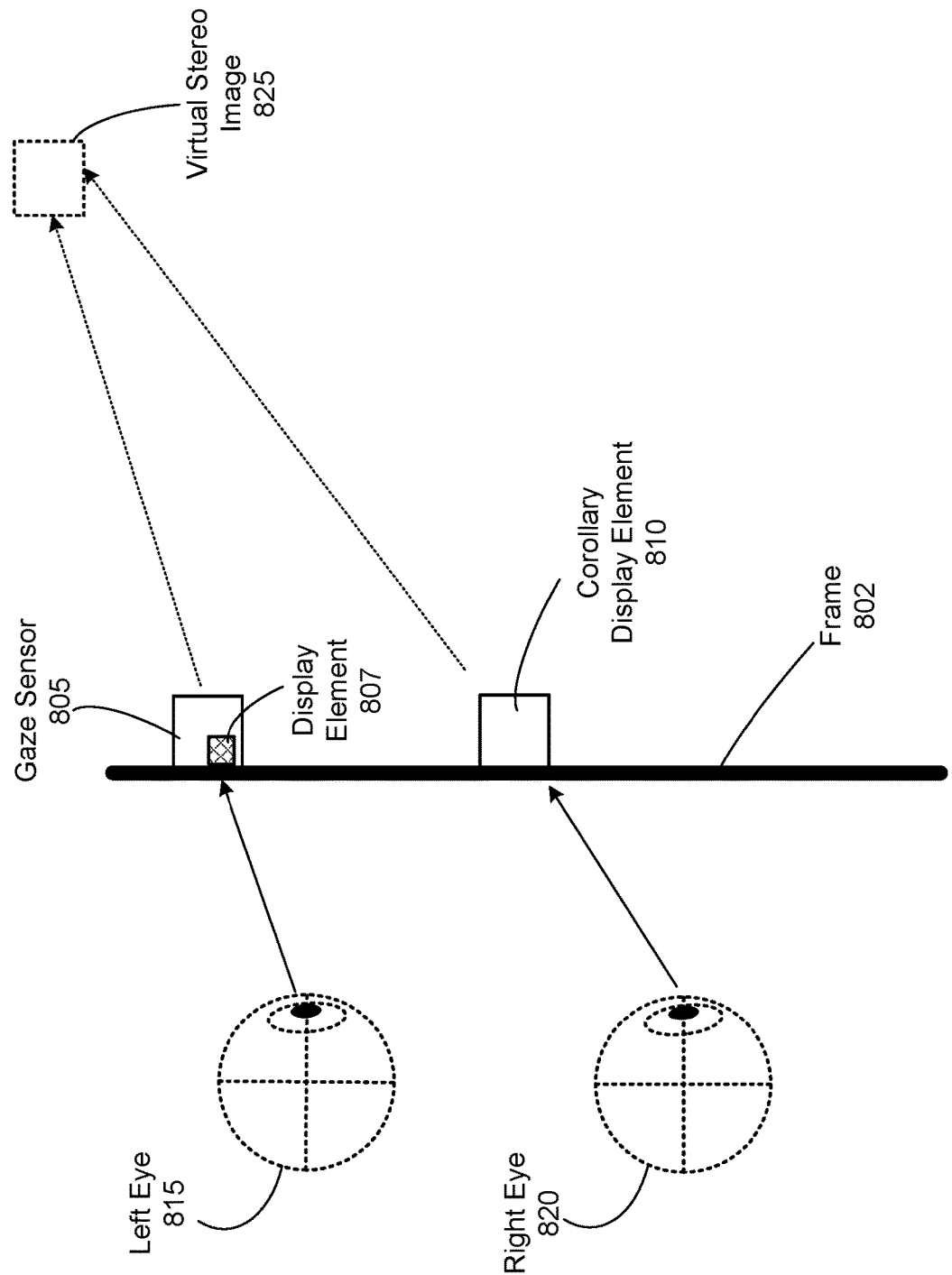
FIG. 8 illustrates an example of a stereo display achieved using a gaze sensor and a corollary display element mounted on a frame of a headset, in accordance with one or more embodiments.

FIG. 8 illustrates an example 800 of a stereo display achieved using a gaze sensor 805 and a corollary display element 810 mounted on a frame 802 of a headset, in accordance with one or more embodiments. As shown in FIG. 8, the gaze sensor 805 includes an integrated display element 807 (e.g., visual feedback display). The gaze sensor 805 may be an embodiment of the gaze sensor 115 in FIG. 3B, and the display element 807 may be an embodiment of the visible light source 325 in FIG. 3B. After a user gazes into the gaze sensor 805 with, e.g., a left eye 815, a right eye 820 would necessarily move into a corresponding position with respect to the frame 802. Images projected at retinas of both eyes 815, 820 emitted from the display element 807 are out of focus and not fused. However, due to a close proximity of the gaze sensor 805 to the eyes 815, 820, the display element 807 and the corollary display element 810 may be positioned on the frame 802 such that projected images (emitted from the display element 807 and the corollary display element 810) on the retinas of both eyes 815, 820 are in focus and fused into a visual stereo image 825 across both eyes 815, 820. As the left eye 815 gazes into the gaze sensor 805 (and the display element 807), the right eye 820 cannot see and fuse an image emitted from the display element 807. However, the right eye 820 would still rotate to a corollary position. Placing another display (i.e., the corollary display element 810) at the corollary position provides for fusion of light emitted from the display element 807 and the corollary display element 810 that appear to the user as a stereo image of a distant object (e.g., as the visual stereo image 825 across both eyes 815, 820).

An imaging stereo effect may also be achieved by placing the gaze sensor 805 so that the corollary display element 810 is positioned such that the eye aligned with the corollary display element 810 (e.g., the right eye 820) views through the user's own nose. In this configuration, the corollary display element 810 can be omitted, and the user may still perceive a stereo quality of the virtual image 825 by virtue of the perceptual suppression of the field of view provided by the user's nose. If the display element 807 and the corollary display element 810 are positioned within an unblocked portion of the user's field of view, each eye 815, 820 needs to be aligned to a corresponding display element in order to see matching light to perceive a stereo object (e.g., the virtual image 825) at a virtual image plane. However, if the virtual image 825 is behind the nose for one of the eyes 815, 820, then there is a natural suppression in the visual perception system that perceives the virtual image 825 would be blocked by the user's nose. Thus, in such case, there is no need to place the corollary display element 810 to be aligned with one of the eyes 815, 820, if the user's brain expects the scene to be blocked by the nose.

FIG. 9 is a flow chart illustrating a process 900 for initiating at least one action associated with a headset based on determination of a direction of a user's gaze vector, in accordance with one or more embodiments. The process 900 of FIG. 9 may be performed by the components of a headset (e.g., the headset 100). Other entities (e.g., a console coupled to the headset) may perform some or all of the steps of the process 900 in other embodiments. Likewise, embodiments may include different and/or additional steps, or perform the steps in different orders.

The headset monitors 910 (e.g., via a controller) a plurality of signals detected by a plurality of gaze sensors, the gaze sensors embedded into a frame of the headset and positioned so that a gaze vector for an eye of a user wearing the headset is within a threshold distance from a gaze sensor of the plurality of gaze sensors. The least one of the gaze sensors may comprise an IR light source and an IR photodiode. The IR light source may emit IR light to the eye of the user, and the IR photodiode may detect a signal of the plurality of signals related to a version of the IR light reflected from at least one surface of the eye. Alternatively or additionally, one or more of the gaze sensors may comprise at least one SMI based gaze sensor configured to detect at least one signal of the plurality of signals related to light reflected from at least one surface of the eye.

The headset determines 920 (e.g., via the controller), based on the monitored signals, that the gaze vector is within the threshold distance from the gaze sensor. In one or more embodiments, the gaze sensor comprises a visible light source. Responsive to the determination that the gaze vector is within the threshold distance of the gaze sensor, the headset (e.g., via the controller) may instruct the visible light source to emit visible collimated light towards the user's eye. In one or more embodiments, the frame of the headset includes a channel at the end of which the visible light source is positioned, and the channel is configured to generate the visible collimated light by collimating visible light directly emitted from the visible light source.

The headset initiates 930 (e.g., via the controller) at least one action associated with the headset based on the determination that the gaze vector is within the threshold distance from the gaze sensor. In some embodiments, the headset adjusts (e.g., via the controller) at least one optical power associated with at least one portion of a lens of the headset, based on the determination that the gaze vector is within the threshold distance from the gaze sensor. In one or more embodiments, the headset decreases (e.g., via the controller) a first optical power of a first portion of the lens, after the gaze sensor is associated with the first portion. For example, the headset adjusts a focus of the first portion of the lens (an upper portion of the lens) to a far field after the user gazes at the upper portion of the lens. In one or more other embodiments, the headset increases (e.g., via the controller) a second optical power of a second portion of the lens, after the gaze sensor becomes associated with the second portion. For example, the headset adjusts a focus of the second portion of the lens (a lower portion of the lens) to a near field after the user gazes at the lower portion of the lens. Additionally or alternatively, the headset adjusts (e.g., via the controller) audio content provided to the user via an audio system, based on the determination that the gaze vector is within the threshold distance from the gaze sensor.

In some embodiments, the headset comprises one or more display elements embedded into the frame. The headset may instruct (e.g., via the controller) a display element of the one or more display elements to emit visible light toward the eye based on the determination that the gaze vector is within the threshold distance from the gaze sensor. The headset may instruct (e.g., via the controller) a display element of the one or more display elements to emit visible light toward the eye based on a status or function of the headset or a signal sent from a paired device independent of any gaze sensor. In one or more embodiments, the display element is implemented as a static display element (e.g., implemented as a holographic display element) configured to project a static image into a retina of the eye based on the determination that the gaze vector is within the threshold distance from the gaze sensor. The static display element may comprise a light emitter in optical series with a mask element having a fixed transfer function. In one or more other embodiments, the display element is implemented as a dynamic display element configured to dynamically update an image projected into the retina based on the determination that the gaze vector is within the threshold distance from the gaze sensor. The dynamic display element may comprise one or more light emitters coupled with a mask element having a dynamically variable transfer function. At least one of the display elements embedded into the frame may be implemented as a "always on" display element. The headset may instruct (e.g., via the controller) the "always on" display element to emit visible light toward the eye, e.g., to indicate a low battery status regardless of the position of gaze vector. In one or more embodiments, at least a pair of the display elements can be embedded into the frame and positioned to project a pair of images on retinas of both user's eyes so that the projected images appear to the user as a fused stereo image.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A headset comprising:
    a plurality of gaze sensors embedded into a frame of the headset and positioned so that a gaze vector for an eye of a user wearing the headset is within a threshold distance from a gaze sensor of the plurality of gaze sensors; and a controller coupled to the plurality of gaze sensors, the controller configured to:
monitor a plurality of signals detected by the gaze sensors,
determine, based on the monitored signals, that the gaze vector is within the threshold distance from the gaze sensor, and
initiate at least one action associated with the headset based on the determination.

2. The headset of claim 1, wherein the gaze vector is positioned such that a gaze location of the eye is on the headset.

3. The headset of claim 1, wherein at least one of the gaze sensors comprises:
an infrared (IR) light source configured to emit IR light to the eye of the user; and
an IR photodiode configured to detect a signal of the plurality of signals related to a version of the IR light reflected from at least one surface of the eye.

4. The headset of claim 1, wherein at least one of the gaze sensors comprises at least one self-mixing interferometer gaze sensor that is configured to detect at least one signal of the plurality of signals related to light reflected from at least one surface of the eye.

5. The headset of claim 1, wherein the gaze sensor comprises a visible light source, and responsive to the determination that the gaze vector is within the threshold distance of the gaze sensor, the controller is configured to instruct the visible light source to emit visible collimated light towards the eye.

6. The headset of claim 5, wherein:
the frame includes a channel at the end of which the visible light source is positioned; and
the channel is configured to generate the visible collimated light by collimating visible light directly emitted from the visible light source.

7. The headset of claim 1, further comprising a lens coupled to the frame, and the controller is further configured to:
adjust at least one optical power associated with at least one portion of the lens based on the determination.

8. The headset of claim 7, wherein the controller is further configured to:
decrease a first optical power of a first portion of the lens, after the gaze sensor is associated with the first portion; and
increase a second optical power of a second portion of the lens separate from the first portion, after the gaze sensor is associated with the second portion.

9. The headset of claim 1, wherein the headset is coupled to an audio system, and the controller is further configured to:
adjust, based on the determination, audio content provided to the user via the audio system.

10. The headset of claim 1, further comprising one or more display elements embedded into the frame, and the controller is further configured to:
instruct a display element of the one or more display elements to emit visible light toward the eye based on the determination.

11. The headset of claim 10, wherein the display element is implemented as a static display element configured to project a static image into a retina of the eye based on the determination.

12. The headset of claim 11, wherein the static display element comprises a holographic display element or a light emitter in optical series with a mask element having a fixed transfer function.

13. The headset of claim 10, wherein the display element is implemented as a dynamic display element configured to dynamically update an image projected into a retina of the eye based on the determination.

14. The headset of claim 13, wherein the dynamic display element comprises one or more light emitters coupled with a mask element having a dynamically variable transfer function.

15. The headset of claim 1, further comprising one or more display elements embedded into the frame, and the controller is further configured to:
instruct a display element of the one or more display elements to emit visible light toward the eye.

16. The headset of claim 1, further comprising a plurality of display elements embedded into the frame, and the controller is further configured to:
instruct a pair of display elements of the plurality of display elements to project a pair of images on retinas of user's eyes, the pair of images appear to the user as a stereo image.

17. The headset of claim 1, wherein the headset comprises a smart electronic eyeglasses.

18. A method comprising:
monitoring a plurality of signals detected by a plurality of gaze sensors, the gaze sensors embedded into a frame of a headset and positioned so that a gaze vector for an eye of a user wearing the headset is within a threshold distance from a gaze sensor of the plurality of gaze sensors;
determining, based on the monitored signals, that the gaze vector is within the threshold distance from the gaze sensor; and
initiating at least one action associated with the headset based on the determination.

19. A headset comprising:
one or more display elements embedded into a frame of the headset and positioned such that a gaze vector for an eye of a user wearing the headset is within a field of view of the one or more display elements; and
a controller coupled to the one or more display elements, the controller configured to:
generate display instructions, and
provide the display instructions to the one or more display elements for configuring the one or more display elements to display information associated with at least one of a status of the headset, one or more features of the headset, and a status of a device paired with the headset.

20. The headset of claim 19, wherein at least one of the one or more display elements is implemented as a dynamic display element configured to dynamically update an image projected into a retina of the eye based on the-determination that the gaze vector is within a threshold distance from a gaze sensor of a plurality of gaze sensors embedded into the frame of the headset.

* * * * *